US012768015B2

(12) United States Patent
Wu et al.

(10) Patent No.: US 12,768,015 B2
(45) Date of Patent: Oct. 20, 2026

(54) PROCESSES FOR FORMING MULTIMETALLIC ALLOYS AND CARBON-SUPPORTED MULTIMETALLIC ALLOYS

(71) Applicant: Honda Motor Co., Ltd., Tokyo (JP)

(72) Inventors: Haibin Wu, Santa Clara, CA (US); Shutang Chen, Livermore, CA (US); Gugang Chen, Palo Alto, CA (US)

(73) Assignee: Honda Motor Co., Ltd., Tokyo (JP)

( * ) Notice: Subject to any disclaimer, the term of this patent is extended or adjusted under 35 U.S.C. 154(b) by 448 days.

(21) Appl. No.: 18/241,751

(22) Filed: Sep. 1, 2023

(65) Prior Publication Data

US 2025/0075298 A1 Mar. 6, 2025

(51) Int. Cl.
*C22C 33/02* (2006.01)
*B22F 1/054* (2022.01)
(Continued)

(52) U.S. Cl.
CPC .......... *C22C 33/0278* (2013.01); *B22F 1/054* (2022.01); *B22F 1/18* (2022.01);
(Continued)

(58) Field of Classification Search
CPC ..... C22C 33/0278; C22C 1/0466; C22C 5/04; C22C 19/03; C22C 30/00; B82Y 40/00;
(Continued)

(56) References Cited

U.S. PATENT DOCUMENTS

2006/0177728 A1 8/2006 Adzic et al.
2007/0034052 A1* 2/2007 Vanheusden .............. B22F 9/24
75/362
(Continued)

FOREIGN PATENT DOCUMENTS

CN 110112430 A * 8/2019 .......... H01M 4/8825
KR 102337247 B1 12/2021

OTHER PUBLICATIONS

CN-110112430-A machine translation (Year: 2019).*
(Continued)

*Primary Examiner* — Tima M. McGuthry-Banks
(74) *Attorney, Agent, or Firm* — Patterson + Sheridan, LLP

(57) ABSTRACT

Aspects of the present disclosure generally relate to processes for forming multimetallic alloys and carbon-supported multimetallic alloys. In an aspect, a process for forming carbon-supported PtNiCoRu nanoparticles is provided. The process includes forming a mixture comprising a platinum (Pt) metal source, a nickel (Ni) metal source, a cobalt (Co) metal source, a ruthenium (Ru) metal source, a carbon source, and a solvent. The process further includes heating the mixture at a temperature that is from about 80° C. to about 250° C. to form carbon-supported nanoparticles, the carbon-supported nanoparticles including a carbon support, and PtNiCoRu single phase alloy nanoparticles chemically bonded to the carbon support. Processes for forming carbon-supported PtNiCoRuFe nanoparticles are also provided. Processes for forming PtNiCoRu and PtNiCoRuFe alloy nanoparticles are also provided.

16 Claims, 7 Drawing Sheets
(2 of 7 Drawing Sheet(s) Filed in Color)

(51) Int. Cl.

| | |
|---|---|
| ***B22F 1/18*** | (2022.01) |
| ***B22F 9/30*** | (2006.01) |
| ***B82Y 40/00*** | (2011.01) |
| ***C22C 1/04*** | (2023.01) |
| ***C22C 5/04*** | (2006.01) |
| ***C22C 19/03*** | (2006.01) |
| ***C22C 30/00*** | (2006.01) |
| ***H01M 4/92*** | (2006.01) |

(52) U.S. Cl.
CPC ................ *B22F 9/30* (2013.01); *B82Y 40/00* (2013.01); *C22C 1/0466* (2013.01); *C22C 5/04* (2013.01); *C22C 19/03* (2013.01); *C22C 30/00* (2013.01); *H01M 4/921* (2013.01); *H01M 4/926* (2013.01); *Y02E 60/50* (2013.01)

(58) Field of Classification Search
CPC .. B22F 1/054; B22F 1/19; B22F 9/30; H01M 9/926; Y02E 60/50
See application file for complete search history.

(56) References Cited

U.S. PATENT DOCUMENTS

2012/0183879 A1* 7/2012 Okada ................ H01M 4/8605 977/773
2022/0258231 A1* 8/2022 Kitagawa ................ B01J 35/45

OTHER PUBLICATIONS

Reddy, Vishwakshan G. et al. Ultrafine Pt—Ru bimetallic nanoparticles anchored on reduced graphene oxide sheets as highly active electrocatalysts for methanol oxidation. Materials Chemical Frontiers. vol. 1, pp. 757-766. DOI: 10.1039/c6qm00212a (Year: 2017).*
Sinoever International. "Properties of Carbon Black." Oct. 13. (Year: 2022).*
Karczmarska, Agnieszka et al. Carbon-supported noble-metal nanoparticles for catalytic applications—a review. Crystals. 12, 584. 33 pages. published Apr. 22. doi.org/10.3390/cryst12050584 (Year: 2022).*
PCT International Search Report and Written Opinion dated Dec. 6, 2024, for International Application No. PCT/US2024/043998.
Yao et al.—"Synthesis of PtCoNiRu/C nanoparticles by spray drying combined with reduction sintering for methanol electro-oxidation," RSC Advances, vol. 10, 2020, pp. 3579-3587.
Rethinasabapathy et al.—"Quaternary PtRuFeCo nanoparticles supported N-doped graphene as an efficient bifunctional electrocatalyst for low-temperature fuel cells," Journal of Industrial and Engineering Chemistry, vol. 69, Jan. 25, 2019 [retrieved on Oct. 1, 2024], retrieved from the internet: <URL: https://www.sciencedirect.com/science/article/abs/pii/S1226086X18308311>, 35 pages.
Mukherjee et al.—"Ru decorated Pt2CoNi/C nanoparticles as a proficient electrocatalyst for oxygen reduction reaction," Jounal of Alloys and Compouonds, vol. 918, Oct. 15, 2022 [retrieved on Oct. 1, 2024], retrieved from the internet: <URL: https://www.sciencedirect.com/science/article/abs/pii/S0925838822019119>, 5 pages.
Wang, X. X.; Swihart, M. T.; Wu, G. Achievements, challenges and perspectives on cathode catalysts in proton exchange membrane fuel cells for transportation. Nature Catalysis 2019, 2 (7), 578-589. DOI: 10.1038/s41929-019-0304-9.
Zhang, P.; Dai, X.; Zhang, X.; Chen, Z.; Yang, Y.; Sun, H.; Wang, X.; Wang, H.; Wang, M.; Su, H.; et al. One-Pot Synthesis of Ternary Pt—Ni—Cu Nanocrystals with High Catalytic Performance. Chemistry of Materials 2015, 27 (18), 6402-6410. DOI: 10.1021/acs.chemmater.5b02575.
Kawaguchi, T.; Komanicky, V.; Latyshev, V.; Cha, W.; Maxey, E. R.; Harder, R.; Ichitsubo, T.; You, H. Electrochemically Induced Strain Evolution in Pt—Ni Alloy Nanoparticles Observed by Bragg Coherent Diffraction Imaging. Nano Lett 2021, 21 (14), 5945-5951. DOI: 10.1021/acs.nanolett.1c00778 From NLM Medline.
Kuttiyiel, K. A.; Choi, Y.; Hwang, S.-M.; Park, G.- G.; Yang, T.-H.; Su, D.; Sasaki, K.; Liu, P.; Adzic, R. R. Enhancement of the oxygen reduction on nitride stabilized pt—M (M=Fe, Co, and Ni) core-shell nanoparticle electrocatalysts. Nano Energy 2015, 13, 442-449. DOI: https://doi.org/10.1016/j.nanoen.2015.03.007.
Batchelor, T. A. A.; Pedersen, J. K.; Winther, S. H.; Castelli, I. E.; Jacobsen, K. W.; Rossmeisl, J. High-Entropy Alloys as a Discovery Platform for Electrocatalysis. Joule 2019, 3 (3), 834-845. DOI: https://doi.org/10.1016/j.ioule.2018.12.015.
Feng, G.; Ning, F.; Song, J.; Shang, H.; Zhang, K.; Ding, Z.; Gao, P.; Chu, W.; Xia, D. Sub-2 nm Ultrasmall High-Entropy Alloy Nanoparticles for Extremely Superior Electrocatalytic Hydrogen Evolution. Journal of the American Chemical Society 2021, 143 (41), 17117-17127. DOI: 10.1021/jacs.1c07643.
Qiu, H.- J.; Fang, G.; Gao, J.; Wen, Y.; Lv, J.; Li, H.; Xie, G.; Liu, X.; Sun, S. Noble Metal-Free Nanoporous High-Entropy Alloys as Highly Efficient Electrocatalysts for Oxygen Evolution Reaction. ACS Materials Letters 2019, 1 (5), 526-533. DOI: 10.1021/acsmaterialslett.9b00414.
George, E. P.; Raabe, D.; Ritchie, R. O. High-entropy alloys. Nature Reviews Materials 2019, 4 (8), 515-534. DOI: 10.1038/s41578-019-0121-4.
Yao, Y.; Huang, Z.; Xie, P.; Lacey, S. D.; Jacob, R. J.; Xie, H.; Chen, F.; Nie, A.; Pu, T.; Rehwoldt, M.; et al. Carbothermal shock synthesis of high-entropy-alloy nanoparticles. Science 2018, 359 (6383), 1489-1494. DOI: doi:10.1126/science.aan5412.
Chen, G.; Li, T.; Chen, C.; Kong, W.; Jiao, M.; Jiang, B.; Xia, Q.; Liang, Z.; Liu, Y.; He, S.; et al. Scalable Wood Hydrogel Membrane with Nanoscale Channels. ACS Nano 2021, 15 (7), 11244-11252. DOI: 10.1021/acsnano.0c10117.
Zhang, Y.; Wang, D.; Wang, S. High-Entropy Alloys for Electrocatalysis: Design, Characterization, and Applications. Small 2022, 18 (7), 2104339. DOI: https://doi.org/10.1002/smll.202104339.
Kin, Y.; Li, S.; Qian, Y.; Zhu, W.; Yuan, H.; Jiang, P.; Guo, R.; Wang, L. High-Entropy Alloys as a Platform for Catalysis: Progress, Challenges, and Opportunities. ACS Catalysis 2020, 10 (19), 11280-11306. DOI: 10.1021/acscatal.0c03617.
Broge, N. L. N.; Bertelsen, A. D.; Søndergaard-Pedersen, F.; Iversen, B. B. Facile Solvothermal Synthesis of Pt—Ir—Pd—Rh—Ru—Cu—Ni—Co High-Entropy Alloy Nanoparticles. Chemistry of Materials 2022. DOI: 0.1021/acs.chemmater.2c02842.

* cited by examiner

PROCESSES FOR FORMING MULTIMETALLIC ALLOYS AND CARBON-SUPPORTED MULTIMETALLIC ALLOYS

FIELD

Aspects of the present disclosure generally relate to processes for forming multimetallic alloys and carbon-supported multimetallic alloys.

BACKGROUND

Platinum (Pt) and its alloys are widely used as fuel cell electrode materials due to their exceptional catalytic performance. While platinum, platinum-nickel, and other Pt-based alloys alternatives demonstrate improved activity compared to typical catalysts, their limited durability, high cost, and limited chemical resistance to corrosion constrains their application as fuel cell electrode materials in corrosive electrolytes. Multimetallic nanoparticles, such as nanoparticles containing four metal elements and five metal elements, have been investigated for their use as electrocatalysts in fuel cells. Conventional methods for forming multimetallic nanoparticles include carbothermal shocks, microwave-assisted heating, and dealloying. Such methods however utilize harsh conditions and/or complicated syntheses. For example, carbothermal shocking utilizes temperatures greater than 1,000° C. and microwave-assisted heating utilizes temperatures greater than 600° C. Dealloying requires synthesis of a multimetallic alloy followed by the selective dissolution of a metal component of the alloy. Each of these synthesis processes is challenging to control because of different nucleation rates, mismatch of crystal lattices, which may result in separation of crystal phases instead of single phase. In addition, to be useful in catalyst applications including as fuel cell catalysts, the multimetallic nanoparticles are to be loaded onto carbon supports. Conventional loading methods, however, are hindered by catalyst detachment, carbon corrosion, catalyst agglomeration, and catalyst dissolution as such methods fail to produce a firm contact between the metals and carbon. Without a good, firm contact between the metal catalysts and the carbon support, the long-term stability and operational durability of the carbon-supported catalysts decreases.

High entropy alloys (HEAs) are multimetallic alloys containing five or more metallic elements in close atomic proportions, and are candidates for energy conversion and storage. Beyond the synthesis and loading challenges described above, most HEAs formed by conventional methods are composed of unevenly distributed alloys in the crystals. In addition, processes for forming single-phase alloy HEAs in an efficient and/or controllable manner have not been achieved.

There is a need for new and improved processes for forming multimetallic alloy nanoparticles and carbon-supported multimetallic alloy nanoparticles. There is also a need for new and improved processes for chemically grafting multimetallic alloy nanoparticles onto carbon supports.

SUMMARY

Aspects of the present disclosure generally relate to processes for forming multimetallic alloys and carbon-supported multimetallic alloys. The multimetallic alloys can be in the form of nanoparticles. Unlike conventional carbon supported catalysts that easily dissolve into an electrolyte solution or drop off from carbon supports, carbon-supported multimetallic alloys formed by aspects described herein are stable due to, for example, chemical bonding between the nanocatalysts and the carbon support. Further, and unlike conventional technologies, processes described herein can enable the formation of a single-phase alloy on a carbon support. In addition, aspects described herein can be utilized to control characteristics of the formed composition, for example, the iron component, by, e.g., adjusting additives such as acid and water. Additionally, single-phase alloys formed by aspects of the present disclosure can demonstrate high chemical resistance against acids, such as sulfuric acid, conventionally utilized in fuel cells.

In an aspect, a process for forming carbon-supported PtNiCoRu nanoparticles is provided. The process includes forming a mixture comprising a platinum (Pt) metal source, a nickel (Ni) metal source, a cobalt (Co) metal source, a ruthenium (Ru) metal source, a carbon source, and a solvent. The process further includes heating the mixture at a temperature that is from about 80° C. to about 250° C. to form carbon-supported nanoparticles, the carbon-supported nanoparticles including a carbon support, and PtNiCoRu single phase alloy nanoparticles chemically bonded to the carbon support.

In another aspect, a process for forming carbon-supported PtNiCoRuFe nanoparticles is provided. The process includes forming a mixture comprising a Pt metal source, a Ni metal source, a Co metal source, a Ru metal source, an iron (Fe) metal source, a carbon source, and a solvent. The process further includes heating the mixture at a temperature that is from about 80° C. to about 250° C. to form carbon-supported nanoparticles, the carbon-supported nanoparticles including a carbon support, and PtNiCoRuFe single phase alloy nanoparticles chemically bonded to the carbon support.

In another aspect, a process for forming multimetallic single phase alloy nanoparticles is provided. The process includes forming a mixture comprising a Pt metal source, a Ni metal source, a Co metal source, a Ru metal source, and a solvent in a reactor. The process further includes heating the mixture in the reactor at a temperature that is from about 80° C. to about 250° C. while the reactor is pressurized from about 0.12 MPa to about 0.22 MPa to form multimetallic single phase alloy nanoparticles comprising Pt, Ni, Co, and Ru.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only exemplary aspects and are therefore not to be considered limiting of its scope, for the disclosure may admit to other equally effective aspects.

DETAILED DESCRIPTION

Figure 1A:
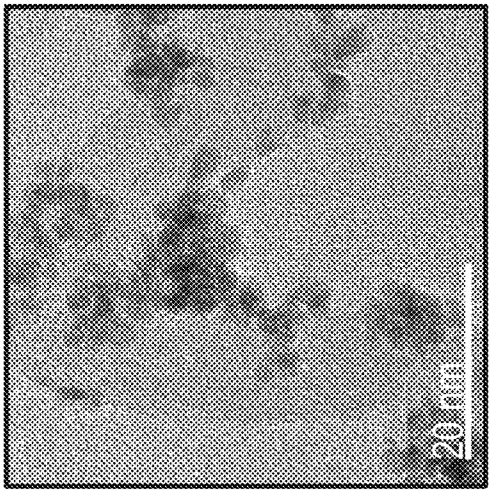
FIG. 1A shows a transmission electron microscopy (TEM) image of example platinum-nickel-cobalt-ruthenium (PtNiCoRu) alloy nanoparticles supported on multiwall carbon nanotubes according to at least one aspect of the present disclosure. (scale: 20 nm).

Aspects of the present disclosure generally relate to processes for forming multimetallic alloys and carbon-supported multimetallic alloys. The multimetallic alloys can be in the form of nanoparticles and can be single-phase alloys. Additionally, or alternatively, the multimetallic alloys can be in the form of nanocrystals. The single phase alloy products, unlike multiphase alloys, can demonstrate high chemical resistance against acids, such as sulfuric acid, conventionally utilized in fuel cells. In some non-limiting aspects, a multimetallic alloy described herein can include at least five metal elements, each metal element contributing no less than 10% of the multimetallic alloy. As such, the multimetallic alloys can be regarded as high entropy alloys. In some aspects, metal elements of the multimetallic alloy can be less than 10% of the multimetallic alloy.

The use of headings is for purposes of convenience only and does not limit the scope of the present disclosure. Aspects described herein can be combined with other aspects.

As used herein, a "composition" can include component(s) of the composition, reaction product(s) of two or more components of the composition, and/or a remainder balance of remaining starting component(s). Compositions of the present disclosure can be prepared by any suitable mixing process.

As used herein, the term "nanoparticles" and "nanocrystals" are used interchangeably such that reference to one includes reference to the other unless specified to the contrary or the context clearly indicates otherwise. For example, reference to "nanoparticles" includes reference to "nanoparticles" and "nanocrystals"

As described above, increased energy use and climate change concerns have spurred the rapid development of technology with low or even zero carbon emissions. One such technology is hydrogen fuel cells. Hydrogen fuel cells are highly efficient energy conversion technologies now used in a variety of vehicles, including automobiles, trucks, and future ocean-going freighters and aircraft. However, there is a pressing need to improve fuel cell technologies to meet energy demands, specifically by reducing Pt usage and maintaining high performance over the long term.

The primary catalysts used in fuel cells are Pt and its alloys. Such catalysts are utilized in fuel cells to enhance the conversion of raw materials to energy via direct electrochemical oxygen reduction reactions, oxygen evolution reactions, and hydrogen evolution reactions. While Pt-based alloys demonstrate improved activity compared to typical catalysts, their limited durability, high cost, and limited chemical resistance to corrosion constrains their application as fuel cell electrode materials in corrosive electrolytes. As an alternative to Pt and Pt-based alloys, multimetallic nanoparticles, such as nanoparticles containing four metal elements and five metal elements, have been investigated for their use as electrocatalysts in fuel cells.

Multimetallic nanoparticles are conventionally formed under harsh conditions of carbothermal shocking and microwave-assisted heating and/or by complicated processes such as dealloying. Dealloying requires synthesis of a multimetallic alloy followed by the selective dissolution of a metal component of the alloy. Temperatures above 600° C. are required for microwave-assisted heating, while carbothermal shocking is performed under temperatures greater than 1,000° C. Each of these synthesis processes is challenging to control because of different nucleation rates, mismatch of crystal lattices, which may result in separation of crystal phases instead of single phase.

In addition, catalyst applications including use in fuel cells. In these fuel cell catalyst applications and other applications, the multimetallic alloy nanoparticles are typically loaded onto carbon supports. However, conventional technologies for loading multimetallic alloy nanoparticles onto supports are hindered by catalyst detachment, carbon corrosion, catalyst agglomeration, and catalyst dissolution. These issues result in, for example, the rapid performance decline in long-term durability tests. With respect to detachment and dissolution, conventional loading methods are unable to produce a firm contact between multimetallic alloy nanocatalysts and carbon. Without a good, firm contact between the multimetallic alloy nanocatalysts and the carbon support, the long-term stability and operational durability of the carbon-supported multimetallic alloy catalysts decreases. For example, supported multimetallic alloy catalysts formed by conventional methods can easily dissolve into electrolyte solution (such as acid solutions) or can drop off from the support during use. As another example, conventional multimetallic alloy catalysts can only physically adsorb onto carbon materials using the available loading methods. Overall, carbon-supported multimetallic alloy catalysts formed by conventional technologies lack stable bonds between the Pt catalysts and the carbon support.

Unlike conventional carbon-supported catalysts that easily dissolve into an electrolyte solution or drop off from carbon supports, carbon-supported multimetallic alloys formed by aspects described herein are stable due to, for example, chemical bonding between the nanocatalysts and the carbon support. Here, multimetallic alloys formed by aspects of the present disclosure can demonstrate high chemical resistance against acids, such as sulfuric acid, conventionally utilized in fuel cells.

Another deficiency in the art relates to multimetallic alloys that contain five or more metallic elements in close atomic proportions. Such alloys are typically referred to as high entropy alloys (HEAs). Most HEAs formed by conventional methods are composed of unevenly distributed alloys in the crystals and exist as multiphase alloys, which impairs the advantages of their high mixing entropy (greater than 1.5R). In contrast, processes described herein can enable the formation of multimetallic alloys (such as HEAs) that are single phase alloys. That is, the multi-metallic alloy nanoparticles can be chemically grafted onto carbon supports by utilizing aspects described herein. Such multimetallic single-phase alloys are better candidates for energy conversion and storage.

In addition, the inventors found that characteristics of the formed composition, such as the iron component, can be controlled by adjusting additives such as acid and water.

Carbon-supported nanoparticles are described herein. Carbon supports can include carbon black, graphene derivatives (for example, graphene oxide and reduced graphene oxide), and multiwall nanotubes. The carbon supports can have various functional groups that can allow interactions (such as chemical bonding, physical bonding, or both) to metals. The carbon-supported nanoparticles described herein can include multimetallic structures chemically bonded to the surface of a carbon support. The chemical bonding between the nanoparticles (the multimetallic structures) and the carbon support can be through the metals of the multimetallic nanoparticles and the carboxyl groups (—COOH), hydroxyl groups (—OH), carbonyl groups (C═O), epoxide groups, and/or ions thereof (for example, $—COO^-$ and/or $—O^-$) present on the carbon support. For example, graphene oxide such as reduced graphene oxide contains one or more of such groups which can chemically bond to the multimetallic nanoparticles.

Processes

Aspects of the present disclosure generally relate to processes for forming multimetallic alloys and carbon-supported multimetallic alloys. Aspects described herein include processes for forming carbon-supported multimetallic PtNiCoRu alloy nanoparticles. Aspects described herein also include processes for forming carbon-supported multimetallic PtNiCoRuFe alloy nanoparticles. The carbon-supported multimetallic alloy nanoparticles, with or without Fe, can be carbon-supported single-phase alloy nanoparticles. Aspects described herein also include processes for forming multimetallic PtNiCoRu alloy nanoparticles and processes for forming multimetallic PtNiCoRuFe alloy nanoparticles.

In some aspects, synthetic strategies described herein utilize a one-pot solvothermal process, thereby simplifying the synthetic process for forming multimetallic alloy nanoparticles on carbon supports. Solvothermal synthesis is a chemical reaction that takes place in a solvent at relatively high temperatures, but much milder than conventional methods for forming multimetallic nanoparticles. In contrast to conventional methods, and in some aspects, processes described herein can utilize a conventional heating oven as opposed to microwave ovens and/or ultrasonic assistance. The reactor for solvothermal syntheses can be a sealed vessel such as a tubular reactor or an autoclave reactor. In some aspects, the processes can be a one-pot process where the starting materials and reagents are mixed in a single pot (or reactor) to form the desired carbon-supported multimetallic alloy nanoparticles. This one-pot synthesis can enable improved efficiency, less production time, and less use of resources relative to conventional technologies. In some aspects, and in contrast to conventional methods which utilize harsh heating conditions, heating temperatures utilized during processes described herein can be milder. For example, heating temperatures can range from about 50° C. or more to about 250° C. or less, such as from about 80° C. to about 220° C.

Carbon-Supported Multimetallic (PtNiCoRu) Alloy Nanoparticles

In some aspects, a process for forming carbon-supported PtNiCoRu alloy nanoparticles can include forming a mixture that includes a platinum (Pt) metal source, a nickel (Ni) metal source, a cobalt (Co) metal source, a ruthenium (Ru) metal source, a carbon source, and a solvent. The mixture can be formed in any suitable reactor such as a tubular reactor or an autoclave reactor. Prior to heating (described below), the mixture can be stirred, mixed, and/or agitated to ensure, e.g., homogeneity of the mixture. In at least one aspect, and prior to heating, the mixture of components can be placed under a non-reactive gas such as nitrogen ($N_2$), argon (Ar), and/or other non-reactive gas(es) to degas various components or otherwise remove oxygen from the reaction mixture and/or mixing environment.

The process further includes heating the mixture to form the carbon-supported multimetallic alloy nanoparticle(s). For heating, the reactor can be placed on or in any suitable heating device such as a heating oven. If desired, a microwave oven can be utilized. Heating can be performed in the form of a one-step heating process or a multi-step heating process. One-step heating process refers to heating the mixture at a selected reaction temperature for a selected period. Multi-step heating process refers to heating the mixture at multiple different reaction temperatures, each at a selected amount of time. The one-step heating process and multi-step heating process are described further below.

Following heating, the formed carbon-supported multimetallic alloy nanoparticle(s) can include PtNiCoRu alloy nanoparticles chemically bonded to a carbon support. The PtNiCoRu alloy can be in the form of a single-phase alloy. Additionally, or alternatively, the PtNiCoRu can be in the form of nanocrystals.

Any suitable Pt metal source, Ni metal source, Co metal source, and Ru metal source (collectively, metal sources) can be utilized to form the carbon-supported PtNiCoRu alloy nanoparticles. The metal sources can include one or more ligands such as halide ($I^-$, $Br^-$, $Cl^-$, or $F^-$), acetylacetonate ($O_2C_5H_7^-$), hydride ($H^-$), $SCN^-$, $NO_2^-$, $NO_3^-$, $N_3^-$, $OH^-$, oxalate ($C_2O_4^{2-}$), $H_2O$, acetate ($CH_3COO^-$), $O_2^-$, $CN^-$, $OCN^-$, $OCN^-$, $CNO^-$, $NH_2^-$, $NH^{2-}$, $NC^-$, $NCS^-$, $N(CN)_2^-$, pyridine (py), ethylenediamine (en), 2,2'-bipyridine (bipy), $PPh_3$, or combinations thereof. In some aspects, the metal source includes metal acetates, metal acetylacetonates, metal halides, metal nitrates, and/or other suitable metal species.

The metal sources can be present in any suitable oxidation state with the ligand(s).

Illustrative, but non-limiting examples of Pt metal sources can include platinum(II) acetylacetonate ($Pt(C_5H_7O_2)_2$ also referred to as $Pt(acac)_2$), hexachloroplatinic acid (or hydrates thereof, for example, $H_2PtCl_6 \cdot 6H_2O$), platinum chloride ($PtCl_4$), potassium platinum(II) chloride ($K_2PtCl_4$), platinum(II) acetate ($Pt(CH_3CO_2)_2$), platinum(IV) acetate ($Pt(CH_3CO_2)_4$), sodium hexachloroplatinate hexahydrate ($Na_2PtCl_6 \cdot 6H_2O$), platinum(III) nitrate ($Pt(NO_3)_2$), hydrates thereof, or combinations thereof, among others.

Illustrative, but non-limiting, examples of Ni metal sources can include nickel(II) bis(acetylacetonate) ($Ni(acac)_2$), nickel(II) chloride ($NiCl_2$, or hydrates thereof, for example, $NiCl_2 \cdot 6H_2O$), nickel(II) acetate ($Ni(CH_3CO_2)_2$), nickel(II) nitrate ($Ni(NO_3)_2$), hydrates thereof, or combinations thereof, among others.

Illustrative, but non-limiting, examples of Co metal sources can include cobalt(II) (acetylacetonate) ($Co(acac)_2$), cobalt(II) chloride ($CoCl_2$, or hydrates thereof, for example, $CoCl_2 \cdot 6H_2O$), Co(II) acetate ($Co(CH_3CO_2)_2$), cobalt(II) nitrate ($Co(NO_3)_2$), hydrates thereof, or combinations thereof, among others.

Illustrative, but non-limiting, examples of Ru metal sources can include ruthenium(III) (acetylacetonate) ($Ru(acac)_3$), ruthenium(III) chloride ($RuCl_3$, or hydrates thereof, for example, $RuCl_3 \cdot 6H_2O$), ruthenium(III) acetate ($Ru(CH_3CO_2)_3$), ruthenium(III) nitrate ($Ru(NO_3)_3$), hydrates thereof, or combinations thereof, among others.

Any suitable carbon source can be utilized for the carbon support of the carbon-supported PtNiCoRu alloy nanoparticles. In some examples, the carbon source can include a material comprising carbon black (for example Vulcan carbon, such as XC-72), carbon nanotube, carbon nanofiber, mesoporous carbon, carbon nanowire, acetylene black, graphite, graphene, graphene oxide, fullerene, or combinations thereof, though other carbon sources are contemplated.

Additionally, or alternatively, the carbon source can include a graphene derivative. Graphene derivatives, as described herein, include structures having graphitic bonds partially incorporating heteroatoms such as oxygen or other structural imperfections in the carbon lattice. Graphene derivatives, as described herein, also include structures such as nanotubes, nanobuds, fullerenes, nano-peapods, endofullerenes, nano-onions, graphene oxide, reduced graphene oxide, lacey carbon, and other non-graphene forms of graphitic carbon which may contain structural or chemical imperfections. Combinations of graphene derivatives can be utilized. In some aspects, the graphene derivative comprises graphene oxide, reduced graphene oxide, or combinations thereof.

In at least one aspect, the carbon source is a material selected from the group consisting of graphene derivative, carbon black, carbon nanotube, carbon nanofiber, mesoporous carbon, carbon nanowire, acetylene black, graphite, graphene, fullerene, or combinations thereof, though other carbon sources are contemplated.

In some aspects of the process for forming the carbon-supported PtNiCoRu alloy nanoparticles, a mixture comprising the metal sources and solvent can be made separately from a mixture comprising the carbon source and a solvent. The individual mixtures can be mixed separately, and then introduced to one another prior to heating in the reactor. Suitable solvents are described below. The solvent utilized for the carbon source can be different than the solvent utilized.

The amount of the individual metal sources used for the reaction (e.g., used for the mixture) to form the carbon-supported PtNiCoRu alloy nanoparticles can be varied based on a total atomic percent (atomic %) of the metal sources. The total atomic % of the metal sources based on the total weight of the Pt metal source, the Ni metal source, the Co metal source, and the Ru metal source, the total atomic % of the metal sources not to exceed 100 atomic %. In some aspects, an amount of each of the Pt metal source, the Ni metal source, the Co metal source, and the Ru metal source used for the reaction (e.g., used for the mixture) can be, independently, from about 5 atomic % to about 30 atomic %, such as from about 10 atomic % to about 25 atomic %, such as from about 15 atomic % to about 20 atomic %, though other amounts are contemplated.

A weight ratio of the total amount of metal sources to the carbon source can be from about 20:1 to about 1:200, such as from about 15:1 to about 1:150, such as from about 10:1 to about 1:100, or from about 5:1 to about 1:50, or from about 1:1 to about 1:20, such as about 1:1, about 1:10, or about 1:5, though other weight ratios are contemplated. Any of the foregoing numbers can be used singly to describe an open-ended range or in combination to describe a close-ended range. The total amount of metal sources is based on the total weight of the metal sources.

Any suitable solvent can be utilized to form the carbon-supported PtNiCoRu alloy nanoparticles. In some aspects, the solvent can be selected based on the reaction temperature selected. Monohydric alcohols solvents (solvents containing one alcohol functional group), polyhydric alcohols (solvents containing two or more alcohol functional groups), or combinations thereof can be utilized as solvents. Polyhydric alcohols are referred to as glycols. Non-limiting examples of polyhydric alcohols can include diols, triols, and/or other polyols such as ethylene glycol, tetraethylene glycol, diethylene glycol, propylene glycol, glycerol (also called glycerin), or combinations thereof, among others.

Illustrative, but non-limiting, examples of alcohols that can be utilized as a solvent include ethylene glycol, diethylene glycol, tetraethylene glycol, propylene glycol, glycerol (also called glycerin), n-propanol, iso-propanol, n-butanol, t-butanol, sec-butanol, tert-butanol, pentanol, hexanol, heptanol, octanol, ethyl-2-hexanol, isooctanol, nonanol, n-decanol, isodecanol, undecanol, dodecanol, tridecanol, tetradecanol, pentadecanol, hexadecanol, heptadecanol, octadecanol, nonadecanol, icosanol, heneicosanol, docosanol, tricosanol, tetracosanol, pentacosanol, hexacosanol, heptacosanol, octacosanol, nonacosanol, or isomers thereof. Monohydric alcohol and polyhydric alcohol (glycolic) solvents containing aromatic rings are also contemplated such as phenols or alcohols containing aromatic groups, such as cardanol, resorcinol, cresol, phenol, bisphenol, or combinations thereof, among others can be utilized. Combinations of solvents in any suitable proportions can be utilized.

In at least one aspect, the solvent can comprise, or be selected from the group consisting of, ethylene glycol, tetraethylene glycol, diethylene glycol, propylene glycol, glycerol, or combinations thereof.

In some aspects, water can be present in the mixture used to form the carbon-supported PtNiCoRu alloy nanoparticles. For example, the carbon source utilized may be an aqueous suspension, such as graphene oxide in water.

In some aspects, the metal sources and the solvent can be mixed prior to addition of the remaining materials (e.g., the carbon source). For example, the Pt metal source, the Ni metal source, the Co metal source, the Ru metal source, and the solvent can be mixed by any suitable method such as by stirring, sonicating, and/or agitating. Optionally, the metal sources can be mixed under the presence of a non-reactive gas such as $N_2$, Ar, and/or other non-reactive gas(es) to degas various components or otherwise remove oxygen from the reaction mixture. Any reasonable pressure can be used mixing of the metal sources and the solvent. Other components, for example, the carbon source. The resulting mixture can then be mixed as described above. The mixture can then be subjected to the heating process.

After a heating process, the carbon-supported multimetallic alloy nanoparticles are formed. The multimetallic alloy can comprise, consist essentially of, or consist of Pt, Ni, Co, and Ru. The carbon-supported multimetallic PtNiCoRu alloy nanoparticles can include a carbon support and multimetallic alloy nanoparticles bonded to the carbon support. The multimetallic PtNiCoRu alloy nanoparticles can be single phase alloy nanoparticles. The multimetallic PtNiCoRu alloy nanoparticles can be chemically bonded to the carbon support, physically bonded to the carbon support, or combinations thereof.

Referring back to the different heating processes (the one-step heating process and the multi-step heating process), the mixture subjected to the heating process can comprise, consist essentially of, or consist of a Pt metal source, a Ni metal source, a Co metal source, a Ru metal source, a carbon source, and a solvent. The different heating processes can provide different ratios of metal elements present in the carbon-supported multimetallic alloy nanoparticles product. As described above, the mixture can be formed in any suitable reactor (such as an autoclave reactor) and the reactor can then be placed in any suitable heating apparatus (such as a heating oven).

Example One-Step Heating Process

In some aspects, the mixture including the metal sources, carbon source, and solvent is reacted by performing by a one-step heating process. The one-step heating process can include heating the mixture at a selected temperature or selected temperature range for a selected amount of time (period). The selected temperature or selected temperature range is a single temperature or single temperature range at which one or more components of the mixture react. The selected temperature or selected temperature range can include the endpoints of the range. The one-step heating process can consist essentially of, or consist of heating the mixture at a single selected temperature or single selected temperature range.

In at least one aspect, the single temperature or single temperature range can be from about 50° C. to about 250° C., such as from about 65° C. to about 245° C., such as from about 80° C. to about 220° C., such as from about 90° C. to about 210° C., such as from about 100° C. to about 200° C., such as from about 110° C. to about 190° C., such as from about 120° C. to about 180° C., such as from about 130° C. to about 170° C., such as from about 140° C. to about 170° C., such as from about 150° C. to about 160° C., though other values are contemplated. Any of the foregoing numbers can be used singly to describe an open-ended range or in combination to describe a close-ended range.

In some aspects, the single temperature or single temperature range can be from about 170° C. to about 250° C., such as from about 180° C. to about 240° C., such as from about 190° C. to about 230° C., such as from about 200° C. to about 220° C., such as about 210° C., though other values are contemplated. Any of the foregoing numbers can be used singly to describe an open-ended range or in combination to describe a close-ended range The time (or period) for heating the mixture during the one-step heating process can be about 6 hours to about 48 hours, such as from about 12 hours to about 42 hours, such as from about 18 hours to about 36 hours, such as from about 24 hours to about 30 hours, though greater or lesser periods of time are contemplated. Conditions for the one-step heating process can optionally include stirring, mixing, and/or agitating the mixture to ensure, e.g., homogeneity of the mixture. In at least one aspect, conditions for the one-step heating process are free of stirring, mixing, and/or agitating during the heating process.

Conditions for the one-step heating process can optionally include using a non-reactive gas (e.g., $N_2$ and/or Ar) to, e.g., remove or substantially remove oxygen from the mixing environment. Suitable operating pressures can be utilized for the one-step heating process. In some examples, the operating pressure can be from about 1 bar (about 0.1 MPa) to about 2.4 bar (0.24 MPa), such as from about 1.2 bar (about 0.12 MPa) to about 2.2 bar (about 0.22 MPa), such as from about 1.4 bar (about 0.14 MPa) to about 2 bar (about 0.2 MPa), such as from about 1.6 bar (about 0.16 MPa) to about 1.8 bar (about 0.18 MPa), though other values are contemplated. Any of the foregoing numbers can be used singly to describe an open-ended range or in combination to describe a close-ended range.

Following the one-step heating process, the mixture can be allowed to cool to room temperature. A result of the one-step heating process is the formation of carbon-supported multimetallic alloy nanoparticles.

Example Multi-Step Heating Process

In some aspects, the mixture including the metal sources, carbon source, and solvent is reacted by performing a multi-step heating process. The multi-step heating process can include heating the mixture at more than one selected temperature or more than one selected temperature range, each selected temperature or selected temperature range having a selected amount of time (period). For example, the multi-step heating process can include heating the mixture at a first temperature or a first temperature range for a first period, then heating the mixture at a second temperature or a second temperature range for a second period, then heating the mixture at a third temperature or a third temperature range for a third period, and so forth. At least two of the selected temperatures or selected temperature ranges are different.

The selected temperatures or selected temperatures ranges during the multi-step heating process are temperatures or temperature at which one or more components of the mixture react. The selected temperatures or selected temperatures ranges during the multi-step heating process can include the endpoints of the range.

After placing in the oven (which can be pre-heated), the mixture can be heated at a first temperature or first temperature range for a first period. In some aspects, the first temperature or first temperature range can be about 50° C. or more, less than 110° C., or combinations thereof, such as from about 55° C. to about 105° C., such as from about 60° C. to about 100° C., such as from about 65° C. to about 95° C., such as from about 70° C. to about 90° C., such as from about 75° C. to about 85° C., such as about 80° C., or from about 80° C. to about 100° C., such as from about 85° C. to about 95° C., though other values are contemplated. Any of the foregoing numbers can be used singly to describe an open-ended range or in combination to describe a close-ended range. The mixture can be heated for any suitable first period such as from about 30 minutes to about 10 hours, such as from about 1 hour to about 8 hours, such as from about 2 hours to about 6 hours, such as from about 3 hours to about 4 hours, such as about 3 hours, though other periods are contemplated. Any of the foregoing numbers can be used singly to describe an open-ended range or in combination to describe a close-ended range.

After heating the mixture at the first temperature or first temperature range for the first period, the mixture is heated at a second temperature or second temperature range for a second period. In some aspects, the second temperature or second temperature range can be 110° C. or more, less than 170° C., or combinations thereof, such as from about 115° C. to about 165° C., such as from about 120° C. to about 160° C., such as from about 125° C. to about 155° C., such as from about 130° C. to about 150° C., such as from about 135° C. to about 145° C., though other values are contemplated. Any of the foregoing numbers can be used singly to describe an open-ended range or in combination to describe a close-ended range. The mixture can be heated for any suitable second period such as from about 12 hours to about 36 hours, such as from about 15 hours to about 33 hours, such as from about 18 hours to about 30 hours, such as from about 21 hours to about 27 hours, such as about 24 hours, though other periods are contemplated. Any of the foregoing numbers can be used singly to describe an open-ended range or in combination to describe a close-ended range.

After heating the mixture at the second temperature or second temperature range for the second period, the mixture is heated at a third temperature or third temperature range for a third period. In some aspects, the second temperature or second temperature range can be 170° C. or more, about 250° C. or less, or combinations thereof, such as from about 175° C. to about 245° C., such as from about 180° C. to about 240° C., such as from about 185° C. to about 235° C., such as from about 190° C. to about 230° C., such as from about 195° C. to about 225° C., such as from about 200° C. to about 220° C., such as from about 205° C. to about 215° C., such as about 210° C., or from about 190° C. to about 210° C. such as from about 195° C. to about 205° C., though other values are contemplated. Any of the foregoing numbers can be used singly to describe an open-ended range or in combination to describe a close-ended range. The mixture can be heated for any suitable third period such as from about 1 hour to about 36 hours, such as from about 6 hours to about 30 hours, such as from about 12 hours to about 24 hours, or from about 1 hour to about 15 hours, such as from about 2 hours to about 12 hours, such as from about 4 hours to about 10 hours, such as from about 6 hours to about 8 hours, such as about 6 hours, though other periods are contemplated. Any of the foregoing numbers can be used singly to describe an open-ended range or in combination to describe a close-ended range.

In some aspects, the total reaction time (heating at the selected temperatures) for the multi-step heating process can vary from about 6 hours to about 72 hours, such as from about 12 hours to about 60 hours, such as from about 18 hours to about 54 hours, such as from about 24 hours to about 48 hours, such as from about 32 hours to about 40 hours, though other periods are contemplated. Any of the foregoing numbers can be used singly to describe an open-ended range or in combination to describe a close-ended range.

Conditions for the multi-step heating process can optionally include stirring, mixing, and/or agitating the mixture to ensure, e.g., homogeneity of the mixture. In at least one aspect, conditions for the multi-step heating process are free of stirring, mixing, and/or agitating during the heating process.

Conditions for the multi-step heating process can optionally include using a non-reactive gas (e.g., $N_2$ and/or Ar) to, e.g., remove or substantially remove oxygen from the mixing environment. Suitable operating pressures can be utilized for the multi-step heating process. In some examples, the operating pressure can be from about 1 bar (about 0.1 MPa) to about 2.4 bar (0.24 MPa), such as from about 1.2 bar (about 0.12 MPa) to about 2.2 bar (about 0.22 MPa), such as from about 1.4 bar (about 0.14 MPa) to about 2 bar (about 0.2 MPa), such as from about 1.6 bar (about 0.16 MPa) to about 1.8 bar (about 0.18 MPa), though other values are contemplated. Any of the foregoing numbers can be used singly to describe an open-ended range or in combination to describe a close-ended range.

Following the multi-step heating process, the mixture can be allowed to cool to room temperature. A result of the multi-step heating process is the formation of carbon-supported multimetallic alloy nanoparticles.

After a heating process (the one-step heating process or multi-step heating process), the carbon-supported multimetallic alloy nanoparticles are formed. The multimetallic alloy can comprise, consist essentially of, or consist of Pt, Ni, Co, and Ru. The carbon-supported multimetallic PtNiCoRu alloy nanoparticles can include a carbon support and multimetallic PtNiCoRu alloy nanoparticles bonded to the carbon support. The multimetallic PtNiCoRu alloy nanoparticles can be single phase alloy nanoparticles. The multimetallic PtNiCoRu alloy nanoparticles can be chemically bonded to the carbon support, physically bonded to the carbon support, or combinations thereof.

The multimetallic alloy of the carbon-supported multimetallic alloy nanoparticles can be represented by the Formula (I):

$$Pt_vNi_wCo_xRu_y \quad (I).$$

In Formula (I), v, w, x, and y are molar amounts of the individual metals.

A molar ratio of v:y of Formula (I) can be from about 10:1 to about 0.1:1, such as from about 5:1 to about 0.2:1, such as from about 3:1 to about 0.3:1, such as from about 2:1 to about 0.5:1, such as from about 1.2:1 to about 0.8:1, though other values are contemplated. Any of the foregoing numbers can be used singly to describe an open-ended range or in combination to describe a close-ended range.

A molar ratio of w:y of Formula (I) can be from about 10:1 to about 0.1:1, such as from about 8:1 to about 0.125:1, such as from about 5:1 to about 0.2:1, such as from about 3:1 to about 0.3:1, such as from about 2:1 to about 0.5:1, though other values are contemplated. Any of the foregoing numbers can be used singly to describe an open-ended range or in combination to describe a close-ended range.

A molar ratio of x:y of Formula (I) can be from about 10:1 to about 0.1:1, such as from about 8:1 to about 0.125:1, such as from about 5:1 to about 0.2:1, such as from about 3:1 to about 0.3:1, such as from about 2:1 to about 0.5:1, though other values are contemplated. Any of the foregoing numbers can be used singly to describe an open-ended range or in combination to describe a close-ended range.

In some examples, the metal elements in the multimetallic PtNiCoRu alloy of the carbon-supported multimetallic alloy nanoparticles described herein can be present in any suitable atomic percent (atomic %). The atomic % of the metal elements in the multimetallic PtNiCoRu alloy is based on the total atomic % of the Pt, the Ni, the Co, and the Ru in the multimetallic PtNiCoRu alloy, the total atomic % not to exceed 100 atomic %.

In some aspects, an atomic % of Pt in a multimetallic PtNiCoRu alloy, based on the total atomic % of the multimetallic PtNiCoRu alloy, can be about 5 atomic % or more, about 60 atomic % or less, or combinations thereof, such as from about 10 atomic % to 30 atomic %, such as from about 12 atomic % to about 28 atomic %, such as from about 14 atomic % to about 26 atomic %, such as from about 16 atomic % to about 24 atomic %, such as from about 18 atomic % to about 22 atomic %, though other amounts are contemplated. Any of the foregoing numbers can be used singly to describe an open-ended range or in combination to describe a close-ended range.

In some aspects, an atomic % of Ni in a PtNiCoRu alloy described herein, based on the total atomic % of the multimetallic PtNiCoRu alloy, can be about 5 atomic % or more, about 60 atomic % or less, or combinations thereof, such as from about 25 atomic % to about 45 atomic %, such as from about 28 atomic % to about 42 atomic %, such as from about 30 atomic % to about 40 atomic %, such as from about 32 atomic % to about 38 atomic %, such as from about 34 atomic % to about 36 atomic %, though other amounts are contemplated. Any of the foregoing numbers can be used singly to describe an open-ended range or in combination to describe a close-ended range.

In some aspects, an atomic % of Co in a PtNiCoRu alloy described herein, based on the total atomic % of the multimetallic PtNiCoRu alloy, can be about 5 atomic % or more, about 40 atomic % or less, or combinations thereof, such as from about 15 atomic % to about 35 atomic %, such as from about 16 atomic % to about 34 atomic %, such as from about 18 atomic % to about 32 atomic %, such as from about 20 atomic % to about 30 atomic %, such as from about 22 atomic % to about 28 atomic %, such as from about 24 atomic % to about 26 atomic %, though other amounts are contemplated. Any of the foregoing numbers can be used singly to describe an open-ended range or in combination to describe a close-ended range.

In some aspects, an atomic % of Ru in a PtNiCoRu alloy described herein, based on the total atomic % of the multimetallic PtNiCoRu alloy, can be about 5 atomic % or more, about 30 atomic % or less, or combinations thereof, such as from about 5 atomic % to about 30 atomic %, such as from about 10 atomic % to about 25 atomic %, such as from about 12 atomic % to about 24 atomic %, from about 14 atomic % to about 22 atomic %, such as from about 16 atomic % to about 20 atomic %, though other amounts are contemplated. Any of the foregoing numbers can be used singly to describe an open-ended range or in combination to describe a close-ended range.

In some examples, the multimetallic PtNiCoRu alloy of the carbon-supported multimetallic alloy nanoparticles described herein can have one or more of the following characteristics:

(a) An atomic % of Pt, based on the total atomic % of the multimetallic PtNiCoRu alloy, that is from about 9 atomic % to about 30 atomic %, such as from about 11 atomic % to about 28 atomic %, such as from about 13 atomic % to about 26 atomic %, such as from about 15 atomic % to about 24 atomic %, such as from about 17 atomic % to about 22 atomic %, such as from about 18 atomic % to about 20 atomic %, though other amounts are contemplated. Any of the foregoing numbers can be used singly to describe an open-ended range or in combination to describe a close-ended range.

(b) An atomic % of Ni, based on the total atomic % of the multimetallic PtNiCoRu alloy, that is from about 25 atomic % to about 52 atomic %, such as from about 28 atomic % to about 50 atomic %, such as from about 33 atomic % to about 45 atomic %, such as from about 35 atomic % to about 42 atomic %, though other amounts are contemplated. Any of the foregoing numbers can be used singly to describe an open-ended range or in combination to describe a close-ended range.

(c) An atomic % of Co, based on the total atomic % of the multimetallic PtNiCoRu alloy, that is from about 13 atomic % to about 34 atomic %, such as from about 18 atomic % to about 29 atomic %, such as from about 20 atomic % to about 28 atomic %, such as from about 22 atomic % to about 26 atomic %, such as from about 23 atomic % to about 25 atomic %, though other amounts are contemplated. Any of the foregoing numbers can be used singly to describe an open-ended range or in combination to describe a close-ended range.

(d) An atomic % of Ru, based on the total atomic % of the multimetallic PtNiCoRu alloy, that is from about 6 atomic % to about 31 atomic %, such as from about 11 atomic % to about 26 atomic %, such as from about 14 atomic % to about 24 atomic %, such as from about 16 atomic % to about 22 atomic %, such as from about 18 atomic % to about 21 atomic %, though other amounts are contemplated. Any of the foregoing numbers can be used singly to describe an open-ended range or in combination to describe a close-ended range.

In (a)-(d), the total atomic % of the multimetallic PtNiCoRu alloy does not exceed 100 atomic %.

Carbon-Supported Multimetallic (PtNiCoRuFe) Alloy Nanoparticles

A high entropy alloy (HEA) is classified as a material that includes 5 or more metallic elements in close to atomic proportions. Sometimes, each metal element of the HEA contributes no less than 10% of the HEA. HEAs exhibit high lattice strain, high resistance against corrosion, and high mechanical hardness, among other characteristics resulting from the mixture of elements. Most HEAs formed by conventional methods are composed of unevenly distributed alloys in the crystals and exist as multiphase alloys, which impairs the advantages of their high mixing entropy. Processes described herein can enable formation of HEAs that are single phase alloys. Processes described herein can also enable formation of carbon-supported HEAs. For example, carbon-supported HEAs can include carbon-supported multimetallic PtNiCoRuFe alloy nanoparticles.

To the inventors' knowledge, aspects described herein are the first report Fe element alloying into such multimetallic alloys in a single phase using a solvothermal method on inducing Fe into an alloy. Here, Fe is difficult to be reduced to metal in such conditions rather than oxides. Although bimetallic and trimetallic particles including Fe are known, and it is very challenging to alloy in systems containing multimetallic components having 4 or more metal elements. In addition, and to the inventors knowledge embodiments described herein enable the first synthesis of graphene-oxide-supported PtNiCoRuFe HEA nanoparticles.

In some aspects, a process for forming carbon-supported PtNiCoRuFe alloy nanoparticles can include forming a mixture that includes a Pt metal source, a Ni metal source, a Co metal source, a Ru metal source, an iron (Fe) metal source, a carbon source, and a solvent. The mixture can be formed in any suitable reactor such as a tubular reactor or an autoclave reactor. Prior to heating (by a one-step or multi-step process), the mixture can be stirred, mixed, and/or agitated to ensure, e.g., homogeneity of the mixture. In at least one aspect, and prior to heating, the mixture of components can be placed under a non-reactive gas such as nitrogen ($N_2$), argon (Ar), and/or other non-reactive gas(es) to degas various components or otherwise remove oxygen from the reaction mixture and/or mixing environment.

The process further includes heating the mixture to form the carbon-supported multimetallic nanoparticle(s). For heating, the reactor can be placed on or in any suitable heating device such as a heating oven. If desired, a microwave oven can be utilized. Heating can be performed in the form of a one-step heating process or a multi-step heating process as described above. Following heating, the formed carbon-supported multimetallic alloy nanoparticle(s) can include PtNiCoRuFe alloy nanoparticles chemically bonded to a carbon support. The PtNiCoRuFe alloy can be in the form of a single-phase alloy. Additionally, or alternatively, the PtNiCoRuFe can be in the form of nanocrystals.

Any suitable Pt metal source, Ni metal source, Co metal source, Ru metal source, and Fe metal source (collectively, metal sources) can be utilized to form the carbon-supported PtNiCoRuFe alloy nanoparticles.

The metal sources can include one or more ligands such as halide ($I^-$, $Br^-$, $Cl^-$, or $F^-$), acetylacetonate ($O_2C_5H_7^-$), hydride ($H^-$), $SCN^-$, $NO_2^-$, $NO_3^-$, $N_3^-$, $OH^-$, oxalate ($C_2O_4^{2-}$), $H_2O$, acetate ($CH_3COO^-$), $O_2^-$, $CN^-$, $OCN^-$, $OCN^-$, $CNO^-$, $NH_2^-$, $NH^{2-}$, $NC^-$, $NCS^-$, $N(CN)_2^-$, pyridine (py), ethylenediamine (en), 2,2'-bipyridine (bipy), $PPh_3$, or combinations thereof. In some aspects, the metal source includes metal acetates, metal acetylacetonates, metal halides, metal nitrates, and/or other suitable metal species. The metal sources can be present in any suitable oxidation state with the ligand(s).

Illustrative, but non-limiting, examples of Pt metal sources, Ni metal sources, Co metal sources, and Ru metal sources are described above. Illustrative, but non-limiting, examples of Fe metal sources can include iron(III) acetylacetonate ($Fe(acac)_3$), iron(III) chloride (Fe, or hydrates thereof, for example, $FeCl_3 \cdot 6H_2O$), iron(III) acetate, iron (III) nitrate ($Fe(NO_3)_3$), hydrates thereof, or combinations thereof, among others Any suitable carbon source can be utilized for the carbon support of the carbon-supported PtNiCoRuFe alloy nanoparticles. Illustrative, but non-limiting, examples of carbon sources are described above.

In some aspects of the process for forming the carbon-supported PtNiCoRuFe alloy nanoparticles, a mixture comprising the metal sources and solvent can be made separately from a mixture comprising the carbon source and a solvent. The individual mixtures can be mixed separately, and then introduced to one another prior to heating in the reactor. Suitable solvents are described below. The solvent utilized for the carbon source can be different than the solvent utilized.

The amount of the individual metal sources used for the reaction (e.g., used for the mixture) to form the carbon-supported PtNiCoRuFe alloy nanoparticles can be varied based on a total atomic % of the metal sources. The total atomic % of the metal sources based on the total weight of the Pt metal source, the Ni metal source, the Co metal source, the Ru metal source, and the Fe metal source, the total atomic % of the metal sources not to exceed 100 atomic %. In some aspects, an amount of each of the Pt metal source, the Ni metal source, the Co metal source, the Ru metal source, and the Fe metal source used for the reaction (e.g., used for the mixture) can be, independently, from about 5 atomic % to about 30 atomic %, such as from about 10 atomic % to about 25 atomic %, such as from about 15 atomic % to about 20 atomic %, though other amounts are contemplated.

A weight ratio of the total amount of metal sources to the carbon source can be from about 20:1 to about 1:200, such as from about 15:1 to about 1:150, such as from about 10:1 to about 1:100, or from about 5:1 to about 1:50, or from about 1:1 to about 1:20, such as about 1:1, about 1:10, or about 1:5, though other weight ratios are contemplated. Any of the foregoing numbers can be used singly to describe an open-ended range or in combination to describe a close-ended range. The total amount of metal sources is based on the total weight of the metal sources.

Any suitable solvent can be utilized, such as those described above. In some aspects, water can be present in the mixture. For example, the carbon source utilized may be an aqueous suspension, such as graphene oxide in water.

In some aspects, the metal sources and the solvent can be mixed prior to addition of the remaining materials (e.g., the carbon source). For example, the Pt metal source, the Ni metal source, the Co metal source, the Ru metal source, the Fe metal source, and the solvent can be mixed by any suitable method such as by stirring, sonicating, and/or agitating. Optionally, the metal sources can be mixed under the presence of a non-reactive gas such as $N_2$, Ar, and/or other non-reactive gas(es) to degas various components or otherwise remove oxygen from the reaction mixture. Any reasonable pressure can be used mixing of the metal sources and the solvent. Other components, for example, the carbon source. The resulting mixture can then be mixed as described above. The mixture can then be subjected to the heating process.

After a heating process, the carbon-supported multimetallic alloy nanoparticles are formed. The multimetallic alloy can comprise, consist essentially of, or consist of Pt, Ni, Co, Ru, and Fe. The carbon-supported multimetallic PtNiCoRuFe alloy nanoparticles can include a carbon support and multimetallic alloy nanoparticles bonded to the carbon support. The multimetallic alloy nanoparticles can be single phase alloy nanoparticles. The multimetallic alloy nanoparticles can be chemically bonded to the carbon support, physically bonded to the carbon support, or combinations thereof.

Referring back to the different heating processes (the one-step heating process and the multi-step heating process), the mixture subjected to the heating process can comprise, consist essentially of, or consist of a Pt metal source, a Ni metal source, a Co metal source, a Ru metal source, a Fe metal source, a carbon source, and a solvent. The different heating processes can provide different ratios of metal elements present in the carbon-supported multimetallic alloy nanoparticles product. As described above, the mixture can be formed in any suitable reactor (such as an autoclave reactor) and the reactor can then be placed in any suitable heating apparatus (such as a heating oven).

The one-step heating process and the multi-step heating process used to form the carbon-supported PtNiCoRuFe nanoparticles can be the same as, or similar to, the one-step heating process and the multi-step heating process used to form the carbon-supported PtNiCoRu nanoparticles described above. Conditions for the one-step heating process and the multi-step heating process are also described above.

In some aspects, the process for forming carbon-supported PtNiCoRuFe nanoparticles can optionally include use of an acid. As mentioned above, the inventors found that the presence and amount of Fe in the multimetallic PtNiCoRuFe nanoparticles can be controlled by, for example, use of additives such as an acid.

When an acid is utilized for forming carbon-supported PtNiCoRuFe nanoparticles, the optional acid may be added to the mixture that includes the metal sources, the carbon source, and the solvent. Any suitable acid can be utilized. In some examples, the acid can include an organic acid, an inorganic acid, or combinations thereof. Illustrative, but non-limiting, examples of acids can include formic acid, acetic acid, carbonic acid, propionic acid, sulfuric acid ($H_2SO_4$), phosphoric acid ($H_3PO_4$), nitric acid ($HNO_3$), perchloric acid ($HClO_4$), hydrochloric acid (HCl), or combinations thereof. The acids can be diluted, for example, diluted nitric acid can be utilized. The acid may be provided as a solution, for example, an aqueous solution. In some aspects, the concentration of acid in the aqueous solution is from about 0.1 M to about 2 M, such as from about 0.5 M to about 1.5 M, such as from about 1 M to about 1.25 M. Any of the foregoing numbers can be used singly to describe an open-ended range or in combination to describe a close-ended range.

When used, and in some aspects, a molar ratio of the total amount of the metal sources to acid can be from about 1:500 to about 1:1, such as from about 1:200 to about 1:1, such as from about 1:50 to about 1:1, such as from about 1:20 to about 1:1, such as from about 1:10 to about 1:5 based on the starting material molar ratio used for the reaction. Any of the foregoing numbers can be used singly to describe an open-ended range or in combination to describe a close-ended range. In some aspects, the molar ratio of the total amount of the metal sources to acid can be from about 1:10 to about 1:1, from about 1:10 to about 1:5, from about 1:5 to about 1:1, from about 1:2 to about 1:1 based on the starting material molar ratio used for the reaction. Any of the foregoing numbers can be used singly to describe an open-ended range or in combination to describe a close-ended range.

After a heating process (the one-step heating process or multi-step heating process), the carbon-supported multimetallic alloy nanoparticles are formed. The multimetallic alloy can comprise, consist essentially of, or consist of Pt, Ni, Co, Ru, and Fe. The carbon-supported multimetallic PtNiCoRuFe alloy nanoparticles can include a carbon support and multimetallic alloy nanoparticles bonded to the carbon support. The multimetallic PtNiCoRuFe alloy nanoparticles can be single phase alloy nanoparticles. The multimetallic PtNiCoRuFe alloy nanoparticles can be chemically bonded to the carbon support, physically bonded to the carbon support, or combinations thereof.

The multimetallic alloy of the carbon-supported multimetallic alloy nanoparticles can be represented by the Formula (II):

$$Pt_vNi_wCo_xRu_yFe_z \qquad \text{(II)}.$$

In Formula (II), v, w, x, y, and z are molar amounts of the individual metals.

A molar ratio of v:y of Formula (II) can be from about 10:1 to about 0.1:1, such as from about 5:1 to about 0.2:1, such as from about 3:1 to about 0.3:1, such as from about 2:1 to about 0.5:1, such as from about 1.2:1 to about 0.8:1, though other values are contemplated. Any of the foregoing numbers can be used singly to describe an open-ended range or in combination to describe a close-ended range.

A molar ratio of w:y of Formula (II) can be from about 10:1 to about 0.1:1, such as from about 8:1 to about 0.125:1, such as from about 5:1 to about 0.2:1, such as from about 4:1 to about 0.25:1, such as from about 2:1 to about 0.5:1, though other values are contemplated. Any of the foregoing numbers can be used singly to describe an open-ended range or in combination to describe a close-ended range.

A molar ratio of x:y of Formula (II) can be from about 10:1 to about 0.1:1, such as from about 8:1 to about 0.125:1, such as from about 5:1 to about 0.2:1, such as from about 4:1 to about 0.25:1, such as from about 2:1 to about 0.5:1, though other values are contemplated. Any of the foregoing numbers can be used singly to describe an open-ended range or in combination to describe a close-ended range.

A molar ratio of z:y of Formula (II) can be from about 10:1 to about 0.1:1, such as from about 8:1 to about 0.125:1, such as from about 5:1 to about 0.2:1, such as from about 4:1 to about 0.25:1, such as from about 2:1 to about 1:1, though other values are contemplated. Any of the foregoing numbers can be used singly to describe an open-ended range or in combination to describe a close-ended range.

In some examples, the metal elements in the multimetallic PtNiCoRuFe alloy of the carbon-supported multimetallic alloy nanoparticles described herein can be present in any suitable atomic %. The atomic % of the metal elements in the multimetallic PtNiCoRuFe alloy is based on the total atomic % of the Pt, the Ni, the Co, the Ru, and the Fe in the multimetallic PtNiCoRuFe alloy, the total atomic % not to exceed 100 atomic %.

In some aspects, an atomic % of Pt in a multimetallic PtNiCoRuFe alloy, based on the total atomic % of the multimetallic PtNiCoRuFe alloy, can be about 5 atomic % or more, about 35 atomic % or less, or combinations thereof, such as from about 5 atomic % to about 30 atomic %, such as from about 10 atomic % to about 25 atomic %, such as from about 10 atomic % to about 15 atomic % or from about 15 atomic % to about 20 atomic %, though other amounts are contemplated. Any of the foregoing numbers can be used singly to describe an open-ended range or in combination to describe a close-ended range.

In some aspects, an atomic % of Ni in a PtNiCoRuFe alloy, based on the total atomic % of the multimetallic PtNiCoRuFe alloy, can be about 5 atomic % or more, about 30 atomic % or less, or combinations thereof, such as from about 5 atomic % to about 30 atomic %, such as from about 10 atomic % to about 25 atomic %, such as from about 10 atomic % to about 15 atomic % or from about 15 atomic % to about 20 atomic %, though other amounts are contemplated. Any of the foregoing numbers can be used singly to describe an open-ended range or in combination to describe a close-ended range.

In some aspects, an atomic % of Co in a PtNiCoRuFe alloy, based on the total atomic % of the multimetallic PtNiCoRuFe alloy, can be about 5 atomic % or more, about 30 atomic % or less, or combinations thereof, such as from about 5 atomic % to about 30 atomic %, such as from about 10 atomic % to about 25 atomic %, such as from about 10 atomic % to about 15 atomic % or from about 15 atomic % to about 20 atomic %, though other amounts are contemplated. Any of the foregoing numbers can be used singly to describe an open-ended range or in combination to describe a close-ended range.

In some aspects, an atomic % of Ru in a PtNiCoRuFe alloy, based on the total atomic % of the multimetallic PtNiCoRuFe alloy, can be about 5 atomic % or more, about 30 atomic % or less, or combinations thereof, such as from about 5 atomic % to about 30 atomic %, such as from about 10 atomic % to about 25 atomic %, such as from about 10 atomic % to about 15 atomic % or from about 15 atomic % to about 20 atomic %, though other amounts are contemplated. Any of the foregoing numbers can be used singly to describe an open-ended range or in combination to describe a close-ended range.

In some aspects, an atomic % of Fe in a PtNiCoRuFe alloy, based on the total atomic % of the multimetallic PtNiCoRuFe alloy, can be about 5 atomic % or more, about 30 atomic % or less, or combinations thereof, such as from about 5 atomic % to about 30 atomic %, such as from about 10 atomic % to about 25 atomic %, such as from about 10 atomic % to about 15 atomic % or from about 15 atomic % to about 20 atomic %, though other amounts are contemplated. Any of the foregoing numbers can be used singly to describe an open-ended range or in combination to describe a close-ended range.

In some examples, the multimetallic PtNiCoRuFe alloy of the carbon-supported multimetallic alloy nanoparticles described herein can have one or more of the following characteristics:

(a) An atomic % of Pt, based on the total atomic % of the multimetallic PtNiCoRuFe alloy, that is from about 18 atomic % to about 32 atomic %, such as from about 20 atomic % to about 30 atomic %, such as from about 22 atomic % to about 28 atomic %, such as from about 24 atomic % to about 26 atomic %, though other amounts are contemplated. Any of the foregoing numbers can be used singly to describe an open-ended range or in combination to describe a close-ended range.

(b) An atomic % of Ni, based on the total atomic % of the multimetallic PtNiCoRuFe alloy, that is from about 20 atomic % to about 34 atomic %, such as from about 22 atomic % to about 32 atomic %, such as from about 24 atomic % to about 30 atomic %, such as from about 26 atomic % to about 28 atomic %, though other amounts are contemplated. Any of the foregoing numbers can be used singly to describe an open-ended range or in combination to describe a close-ended range.

(c) An atomic % of Co, based on the total atomic % of the multimetallic PtNiCoRuFe alloy, that is from about 12 atomic % to about 26 atomic %, such as from about 14 atomic % to about 24 atomic %, such as from about 16 atomic % to about 22 atomic %, such as from about 18 atomic % to about 20 atomic %, though other amounts are contemplated. Any of the foregoing numbers can be used singly to describe an open-ended range or in combination to describe a close-ended range.

(d) An atomic % of Ru, based on the total atomic % of the multimetallic PtNiCoRuFe alloy, that is from about 12 atomic % to about 24 atomic %, such as from about 14 atomic % to about 22 atomic %, such as from about 16 atomic % to about 20 atomic %, such as from about 17 atomic % to about 19 atomic %, though other amounts are contemplated. Any of the foregoing numbers can be used singly to describe an open-ended range or in combination to describe a close-ended range.

(e) An atomic % of Fe, based on the total atomic % of the multimetallic PtNiCoRuFe alloy, that is from about 4 atomic % to about 16 atomic %, such as from about 6 atomic % to about 14 atomic %, such as from about 8 atomic % to about 12 atomic %, such as from about 9 atomic % to about 11 atomic %, though other amounts are contemplated. Any of the foregoing numbers can be used singly to describe an open-ended range or in combination to describe a close-ended range.

In (a)-(e), the total atomic % of the multimetallic PtNiCoRuFe alloy does not exceed 100 atomic %.

In some aspects, the carbon-supported multimetallic alloy nanoparticles, with or without Fe, can be formed from the same general process. For example, and in some aspects, all metal precursors (metal sources) and the carbon source can be added to a reactor. Use of a selected amount of an acid such as formic acid can lead to no Fe in the carbon-supported multimetallic alloy nanoparticles.

Multimetallic Nanoparticles

Multimetallic nanoparticles not supported on carbon can also be synthesized utilizing processes described herein. PtNiCoRu alloy nanoparticles can be formed by a similar process as that described above for the carbon-supported PtNiCoRu alloy nanoparticles except that no carbon source is utilized.

In some aspects, a process for forming PtNiCoRu alloy nanoparticles can include forming a mixture that includes a Pt metal source, a Ni metal source, a Co metal source, a Ru metal source, and a solvent. The mixture can be formed in any suitable reactor such as a tubular reactor or an autoclave reactor. Prior to heating (by a one-step or multi-step heating process), the mixture can be stirred, mixed, and/or agitated to ensure, e.g., homogeneity of the mixture. In at least one aspect, and prior to heating, the mixture of components can be placed under a non-reactive gas such as nitrogen ($N_2$), argon (Ar), and/or other non-reactive gas(es) to degas various components or otherwise remove oxygen from the reaction mixture and/or mixing environment.

The process further includes heating the mixture to form the multimetallic nanoparticle(s). For heating, the reactor can be placed on or in any suitable heating device such as a heating oven. If desired, a microwave oven can be utilized. Heating can be performed in the form of a one-step heating process or a multi-step heating process.

Any suitable Pt metal source, Ni metal source, Co metal source, and Ru metal source can be utilized to form the PtNiCoRu alloy nanoparticles. Solvents, conditions, and operations, among other parameters of the process that can be utilized are described above with respect to the carbon-supported PtNiCoRu alloy nanoparticles.

The PtNiCoRu alloy nanoparticles can have similar properties as the PtNiCoRu alloy nanoparticles of Formula (I) that are carbon-supported, such as atomic % of the individual metal elements, molar ratios of the metal elements, and being single phase alloys, among other properties.

In some examples, the metal elements in the multimetallic PtNiCoRu alloy nanoparticles described herein can be present in any suitable atomic %. The atomic % of the metal elements in the multimetallic PtNiCoRu alloy is based on the total atomic % of the Pt, the Ni, the Co, and the Ru in the multimetallic PtNiCoRu alloy, the total atomic % not to exceed 100 atomic %.

In some aspects, an atomic % of Pt in a multimetallic PtNiCoRu alloy, based on the total atomic % of the multimetallic PtNiCoRu alloy, can be about 5 atomic % or more, about 60 atomic % or less, or combinations thereof, such as from about 25 atomic % to about 60 atomic %, such as from about 30 atomic % to about 55 atomic %, such as from about 35 atomic % to about 50 atomic % or from about 42 atomic % to about 48 atomic %, though other amounts are contemplated. Any of the foregoing numbers can be used singly to describe an open-ended range or in combination to describe a close-ended range.

In some aspects, an atomic % of Ni in a PtNiCoRu alloy described herein, based on the total atomic % of the multimetallic PtNiCoRu alloy, can be about 5 atomic % or more, about 30 atomic % or less, or combinations thereof, such as from about 5 atomic % to about 30 atomic %, such as from about 10 atomic % to about 25 atomic %, such as from about 15 atomic % to about 24 atomic % or from about 18 atomic % to about 22 atomic %, though other amounts are contemplated. Any of the foregoing numbers can be used singly to describe an open-ended range or in combination to describe a close-ended range.

In some aspects, an atomic % of Co in a PtNiCoRu alloy described herein, based on the total atomic % of the multimetallic PtNiCoRu alloy, can be about 5 atomic % or more, about 30 atomic % or less, or combinations thereof, such as from about 5 atomic % to about 25 atomic %, such as from about 8 atomic % to about 18 atomic %, such as from about 9 atomic % to about 15 atomic % or from about 10 atomic % to about 14 atomic %, though other amounts are contemplated. Any of the foregoing numbers can be used singly to describe an open-ended range or in combination to describe a close-ended range.

In some aspects, an atomic % of Ru in a PtNiCoRu alloy described herein, based on the total atomic % of the multimetallic PtNiCoRu alloy, can be about 5 atomic % or more, about 50 atomic % or less, or combinations thereof, such as from about 5 atomic % to about 40 atomic %, such as from about 10 atomic % to about 35 atomic %, such as from about 15 atomic % to about 30 atomic % or from about 20 atomic % to about 25 atomic %, though other amounts are contemplated. Any of the foregoing numbers can be used singly to describe an open-ended range or in combination to describe a close-ended range.

In some examples, the multimetallic PtNiCoRu alloy nanoparticles described herein can have one or more of the following characteristics:

(a) An atomic % of Pt, based on the total atomic % of the multimetallic PtNiCoRu alloy, that is from about 37 atomic % to about 57 atomic %, such as from about 40 atomic % to about 54 atomic %, such as from about 43 atomic % to about 51 atomic %, such as from about 46 atomic % to about 48 atomic %, though other amounts are contemplated. Any of the foregoing numbers can be used singly to describe an open-ended range or in combination to describe a close-ended range.

(b) An atomic % of Ni, based on the total atomic % of the multimetallic PtNiCoRu alloy, that is from about 9 atomic % to about 29 atomic %, such as from about 12 atomic % to about 26 atomic %, such as from about 15 atomic % to about 23 atomic %, such as from about 18 atomic % to about 21 atomic %, though other amounts are contemplated. Any of the foregoing numbers can be used singly to describe an open-ended range or in combination to describe a close-ended range.

(c) An atomic % of Co, based on the total atomic % of the multimetallic PtNiCoRu alloy, that is from about 3 atomic % to about 20 atomic %, such as from about 5 atomic % to about 17 atomic %, such as from about 8 atomic % to about 14 atomic %, such as from about 9 atomic % to about 12 atomic %, though other amounts are contemplated. Any of the foregoing numbers can be used singly to describe an open-ended range or in combination to describe a close-ended range.

(d) An atomic % of Ru, based on the total atomic % of the multimetallic PtNiCoRu alloy, that is from about 14 atomic % to about 34 atomic %, such as from about 17 atomic % to about 31 atomic %, such as from about 20 atomic % to about 28 atomic %, such as from about 23 atomic % to about 25 atomic %, though other amounts are contemplated. Any of the foregoing numbers can be used singly to describe an open-ended range or in combination to describe a close-ended range.

In (a)-(d), the total atomic % of the multimetallic PtNiCoRu alloy does not exceed 100 atomic %.

PtNiCoRuFe alloy nanoparticles can be formed by a similar process as that described above for the carbon-supported PtNiCoRuFe alloy nanoparticles except that no carbon source is utilized.

In some aspects, a process for forming PtNiCoRuFe alloy nanoparticles can include forming a mixture that includes a Pt metal source, a Ni metal source, a Co metal source, a Ru, a Fe metal source, and a solvent. The mixture can be formed in any suitable reactor such as a tubular reactor or an autoclave reactor. Prior to heating (by a one-step or multi-step process), the mixture can be stirred, mixed, and/or agitated to ensure, e.g., homogeneity of the mixture. In at least one aspect, and prior to heating, the mixture of components can be placed under a non-reactive gas such as nitrogen ($N_2$), argon (Ar), and/or other non-reactive gas(es) to degas various components or otherwise remove oxygen from the reaction mixture and/or mixing environment.

The process further includes heating the mixture to form the multimetallic nanoparticle(s). For heating, the reactor can be placed on or in any suitable heating device such as a heating oven. If desired, a microwave oven can be utilized. Heating can be performed in the form of a one-step heating process or a multi-step heating process.

Any suitable Pt metal source, Ni metal source, Co metal source, and Ru metal source can be utilized to form the PtNiCoRuFe alloy nanoparticles. Solvents, conditions, and operations, among other parameters of the process that can be utilized are described above with respect to the carbon-supported PtNiCoRuFe alloy nanoparticles.

The PtNiCoRuFe alloy nanoparticles can have similar properties as the PtNiCoRuFe alloy nanoparticles of Formula (II) that are carbon supported, such as atomic % of the individual metal elements, molar ratios of the metal elements, and being single phase alloys, among other properties.

In some examples, the metal elements in the multimetallic PtNiCoRuFe alloy nanoparticles described herein can be present in any suitable atomic %. The atomic % of the metal elements in the multimetallic PtNiCoRuFe alloy is based on the total atomic % of the Pt, the Ni, the Co, the Ru, and the Fe in the multimetallic PtNiCoRuFe alloy, the total atomic % not to exceed 100 atomic %.

In some aspects, an atomic % of Pt in a multimetallic PtNiCoRuFe alloy, based on the total atomic % of the multimetallic PtNiCoRuFe alloy, can be about 5 atomic % or more, about 35 atomic % or less, or combinations thereof, such as from about 5 atomic % to about 30 atomic %, such as from about 10 atomic % to about 25 atomic %, such as from about 10 atomic % to about 15 atomic % or from about 15 atomic % to about 20 atomic %, though other amounts are contemplated. Any of the foregoing numbers can be used singly to describe an open-ended range or in combination to describe a close-ended range.

In some aspects, an atomic % of Ni in a PtNiCoRuFe alloy, based on the total atomic % of the multimetallic PtNiCoRuFe alloy, can be about 5 atomic % or more, about 30 atomic % or less, or combinations thereof, such as from about 5 atomic % to about 30 atomic %, such as from about 10 atomic % to about 25 atomic %, such as from about 10 atomic % to about 15 atomic % or from about 15 atomic % to about 20 atomic %, though other amounts are contemplated. Any of the foregoing numbers can be used singly to describe an open-ended range or in combination to describe a close-ended range.

In some aspects, an atomic % of Co in a PtNiCoRuFe alloy, based on the total atomic % of the multimetallic PtNiCoRuFe alloy, can be about 5 atomic % or more, about 30 atomic % or less, or combinations thereof, such as from about 5 atomic % to about 30 atomic %, such as from about 10 atomic % to about 25 atomic %, such as from about 10 atomic % to about 15 atomic % or from about 15 atomic % to about 20 atomic %, though other amounts are contemplated. Any of the foregoing numbers can be used singly to describe an open-ended range or in combination to describe a close-ended range.

In some aspects, an atomic % of Ru in a PtNiCoRuFe alloy, based on the total atomic % of the multimetallic PtNiCoRuFe alloy, can be about 5 atomic % or more, about 30 atomic % or less, or combinations thereof, such as from about 5 atomic % to about 30 atomic %, such as from about 10 atomic % to about 25 atomic %, such as from about 10 atomic % to about 15 atomic % or from about 15 atomic % to about 20 atomic %, though other amounts are contemplated. Any of the foregoing numbers can be used singly to describe an open-ended range or in combination to describe a close-ended range.

In some aspects, an atomic % of Fe in a PtNiCoRuFe alloy, based on the total atomic % of the multimetallic PtNiCoRuFe alloy, can be about 5 atomic % or more, about 30 atomic % or less, or combinations thereof, such as from about 5 atomic % to about 30 atomic %, such as from about 10 atomic % to about 25 atomic %, such as from about 10 atomic % to about 15 atomic % or from about 15 atomic % to about 20 atomic %, though other amounts are contemplated. Any of the foregoing numbers can be used singly to describe an open-ended range or in combination to describe a close-ended range.

In some examples, the multimetallic PtNiCoRuFe alloy nanoparticles described herein can have one or more of the following characteristics:

(a) An atomic % of Pt, based on the total atomic % of the multimetallic PtNiCoRuFe alloy, that is from about 18 atomic % to about 32 atomic %, such as from about 20 atomic % to about 30 atomic %, such as from about 22 atomic % to about 28 atomic %, such as from about 24 atomic % to about 26 atomic %, though other amounts are contemplated. Any of the foregoing numbers can be used singly to describe an open-ended range or in combination to describe a close-ended range.

(b) An atomic % of Ni, based on the total atomic % of the multimetallic PtNiCoRuFe alloy, that is from about 20 atomic % to about 34 atomic %, such as from about 22 atomic % to about 32 atomic %, such as from about 24 atomic % to about 30 atomic %, such as from about 26 atomic % to about 28 atomic %, though other amounts are contemplated. Any of the foregoing numbers can be used singly to describe an open-ended range or in combination to describe a close-ended range.

(c) An atomic % of Co, based on the total atomic % of the multimetallic PtNiCoRuFe alloy, that is from about 12 atomic % to about 26 atomic %, such as from about 14 atomic % to about 24 atomic %, such as from about 16 atomic % to about 22 atomic %, such as from about 18 atomic % to about 20 atomic %, though other amounts are contemplated. Any of the foregoing numbers can be used singly to describe an open-ended range or in combination to describe a close-ended range.

(d) An atomic % of Ru, based on the total atomic % of the multimetallic PtNiCoRuFe alloy, that is from about 12 atomic % to about 24 atomic %, such as from about 14 atomic % to about 22 atomic %, such as from about 16 atomic % to about 20 atomic %, such as from about 17 atomic % to about 19 atomic %, though other amounts are contemplated. Any of the foregoing numbers can be used singly to describe an open-ended range or in combination to describe a close-ended range.

(e) An atomic % of Fe, based on the total atomic % of the multimetallic PtNiCoRuFe alloy, that is from about 4 atomic % to about 16 atomic %, such as from about 6 atomic % to about 14 atomic %, such as from about 8 atomic % to about 12 atomic %, such as from about 9 atomic % to about 11 atomic %, though other amounts are contemplated. Any of the foregoing numbers can be used singly to describe an open-ended range or in combination to describe a close-ended range.

In (a)-(e), the total atomic % of the multimetallic PtNiCoRuFe alloy does not exceed 100 atomic %.

The following examples are put forth so as to provide those of ordinary skill in the art with a complete disclosure and description of how to make and use aspects of the present disclosure, and are not intended to limit the scope of aspects of the present disclosure. Efforts have been made to ensure accuracy with respect to numbers used (such as the amounts, dimensions) but some experimental errors and deviations should be accounted for.

EXAMPLES

Various example, but non-limiting, multimetallic nanoparticles and carbon-supported multi-metallic nanoparticles were made according to some aspects described herein.

Materials and Characterization Methods

Materials

Reduced graphene oxide (rGO, 2 mg/ml solution), platinum (II) bis(acetylacetonate) ($Pt(acac)_2$, 99%), cobalt (II) acetylacetonate ($Co(acac)_2$, 97%), nickel (II) bis(acetylacetonate) ($Ni(acac)_2$, 99%), iron(III) (acetylacetonate) ($Fe(acac)_3$, 99%), ethylene glycol (EG, 99%), and tetraethylene glycol (TG, 99%) were purchased from Sigma-Aldrich. Ruthenium (III) acetylacetonate ($Ru(acac)_3$, 99%) was purchased from Alfa Aesar. Vulcan XC-72 carbon black was purchased. All chemicals were used as received. Milli-Q water was also used in the experiments.

Characterization Methods

X-ray diffraction (XRD) patterns were collected using a Bruker D8 Advance X-ray diffractometer with Cu Kα radiation operated at a tube voltage of 40 kV and a current of 40 mA.

The morphologies were investigated by transmission electron microscopy (TEM). TEM images were captured using an FEI Tecnai 20 microscope with an accelerating voltage of 200 kV.

Energy dispersive x-ray spectrometry (EDS) mapping images and high-angle annular dark-field (HAADF) images were collected using an FEI Tecnai 20 microscope with an accelerating voltage of 200 kV.

Example 1: Example Direct Synthesis of PtNiCoRu Alloy Nanoparticles on Multiwall Carbon Nanotube A one-step heating method was utilized for the synthesis. The synthesis method is a solvothermal approach using a 100 mL hydrothermal autoclave and a conventional oven for heating. First, $Pt(acac)_2$ (40 mg), $Ru(acac)_3$ (40 mg), $Co(acac)_3$ (40 mg), and $Ni(acac)_2$ (40 mg) were sonicated for about 10 minutes in tetraethylene glycol (8 mL) to form a metal precursor mixture.

Carbon nanotubes (20 mg) were dispersed in ethylene glycol (EG, 10 mL) for about 30 min to form a uniform carbon-EG suspension due to high viscosity of the solvent. 2 mL of the carbon nanotubes-EG suspension was gradually added into the metal precursor mixture with vigorously stirring for at least 20 min. The resulting well-mixed black suspension containing all precursors was transferred to the 100 mL autoclave reactor in the oven.

A heating oven was pre-heated to a temperature of about 210° C. The autoclave reactor containing the suspension was placed in the pre-heated oven and heated at the temperature of about 210° C. for about 24 hours. After the one-step heating process, the reactor was allowed to cool to about room temperature (about 20° C.) which took approximately 6 hours.

To remove excess unreacted precursors, solvent, and/or other byproducts, the supernatant was decanted, and about 25 mL of isopropanol (IPA) was added. The products were sonicated for about 30 minutes in the IPA to remove adsorbed solvent molecules. The products were separated by centrifuging at about 8,000 rpm for about 20 minutes. If desired, an additional 20 minutes of centrifugation at about 8,000 rpm was performed to remove adsorbed solvent molecules. The black sediment was retrieved and washed by adding IPA or water with sonication for about 30 minutes, followed by centrifugation at about 7,000 rpm for about 15 minutes. This washing procedure was repeated twice more. The precipitate from the suspension was dried in a vacuum desiccator before further characterization and application.

Figure 1B:
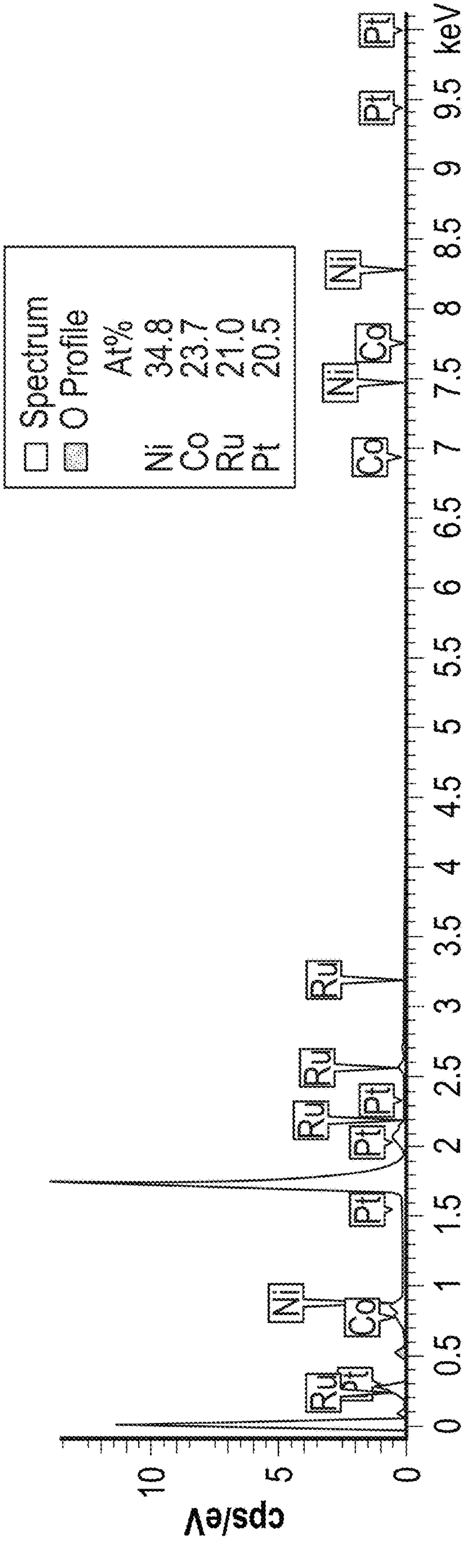
FIG. 1B is a scanning electron microscopy-energy dispersive spectroscopy (SEM-EDS) spectrum of the example carbon-supported PtNiCoRu alloy nanoparticles of FIG. 1A according to at least one aspect of the present disclosure.

The resulting PtNiCoRu alloy of the carbon-supported PtNiCoRu alloy nanoparticles were determined to exist as single phase alloy nanoparticles. The PtNiCoRu alloy nanoparticles were determined to be chemically bonded to the carbon black. A TEM image and SEM EDS spectrum of the carbon-supported PtNiCoRu alloy nanoparticles are shown in FIGS. 1A and 1B respectively.

Various parameters were also investigated. For example, the temperature can vary from about 80° C. to about 220° C. The total reaction time (heating at the selected temperature) can vary from about 6 hours to about 48 hours. The amounts of each metal source can vary from about 10 mg to about 60 mg, and the amounts of carbon source and solvents can be varied. Other metal precursors such as chlorides, acetates, and nitrates can be utilized.

Example 2: Example Synthesis of PtNiCoRu Alloy Nanoparticles

A one-step heating method was utilized for the synthesis. The synthesis method is a solvothermal approach using a 100 mL hydrothermal autoclave and a conventional oven for heating. First, $Pt(acac)_2$ (40 mg), $Ru(acac)_3$ (40 mg), $Co(acac)_3$ (40 mg), and $Ni(acac)_2$ (40 mg) were sonicated for about 10 minutes in tetraethylene glycol (10 mL). The mixture was mixed and then transferred to the 100 mL autoclave reactor in the oven.

A heating oven was pre-heated to a temperature of about 210° C. The autoclave reactor containing the suspension was placed in the pre-heated oven and heated at the temperature of about 210° C. for about 24 hours. After the one-step heating process, the reactor was allowed to cool to about room temperature (about 20° C.) which took approximately 6 hours.

To remove excess unreacted precursors, solvent, and/or other byproducts, the supernatant was decanted, and about 25 mL of isopropanol (IPA) was added. The products were sonicated for about 30 minutes in the IPA to remove adsorbed solvent molecules. The products were separated by centrifuging at about 8,000 rpm for about 20 minutes. If desired, an additional 20 minutes of centrifugation at 8,000 rpm was performed to remove adsorbed solvent molecules. The black sediment was retrieved and washed by adding IPA or water with sonication for about 30 minutes, followed by centrifugation at about 7,000 rpm for about 15 minutes. This washing procedure was repeated twice more. The precipitate from the suspension was dried in a vacuum desiccator before further characterization and application.

Figure 1C:
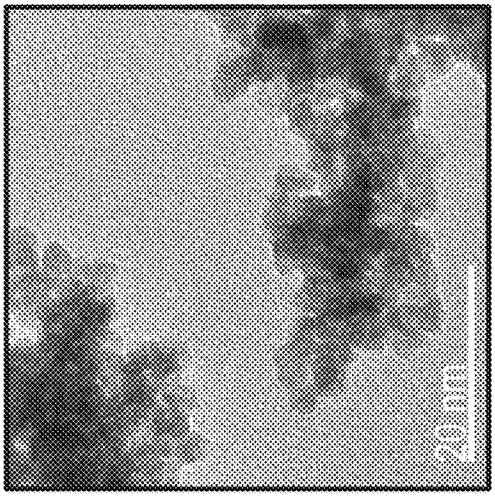
FIG. 1C shows a TEM image of example PtNiCoRu alloy nanoparticles according to at least one aspect of the present disclosure. (scale: 20 nm).
Figure 1D:
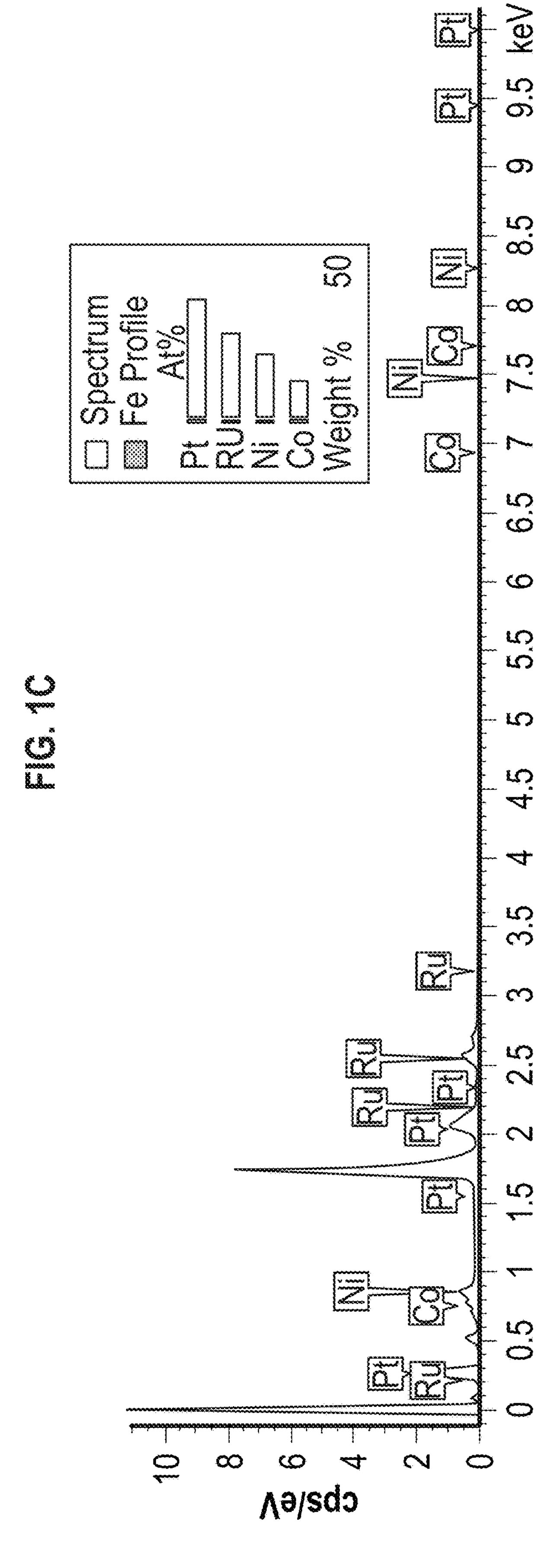
FIG. 1D is a SEM-EDS spectrum of the example PtNiCoRu alloy nanoparticles of FIG. 1C according to at least one aspect of the present disclosure.

The resulting PtNiCoRu alloy nanoparticles were determined to exist as single phase alloy nanoparticles. A TEM image and SEM EDS spectrum of the alloy nanoparticles are shown in FIGS. 1C and 1D respectively.

Various parameters were also investigated. For example, the temperature can vary from about 80° C. to about 220° C. The total reaction time (heating at the selected temperature) can vary from about 6 hours to about 48 hours. The amounts of each metal source can vary from about 10 mg to about 60 mg, and the amounts of carbon source and solvents can be varied. Other metal precursors such as chlorides, acetates, and nitrates can be utilized.

Example 3: Example Direct Synthesis of PtNiCoRu Alloy Nanoparticles on Carbon Black A one-step heating method was utilized for the synthesis. The synthesis method is a solvothermal approach using a 100 mL hydrothermal autoclave and a conventional oven for heating. First, $Pt(acac)_2$ (40 mg), $Ru(acac)_3$ (40 mg), $Co(acac)_3$ (40 mg), and $Ni(acac)_2$ (40 mg) were sonicated for about 10 minutes in tetraethylene glycol (8 mL) to form a metal precursor mixture.

Carbon black (Vulcan XC-72, 20 mg) was dispersed in 10 mL ethylene glycol (EG) for 30 min to form a uniform carbon-EG suspension due to high viscosity of the solvent. 2 mL carbon black-EG suspension was gradually added into the metal precursor mixture with vigorously stirring for at least 20 min. The resulting well-mixed black suspension containing all precursors was transferred to the 100 mL autoclave reactor in the oven.

A heating oven was pre-heated to a temperature of about 210° C. The autoclave reactor containing the suspension was placed in the pre-heated oven and heated at the temperature of about 210° C. for about 24 hours. After the one-step heating process, the reactor was allowed to cool to about room temperature (about 20° C.) which took approximately 6 hours.

To remove excess unreacted precursors, solvent, and/or other byproducts, the supernatant was decanted, and about 25 mL of isopropanol (IPA) was added. The products were sonicated for about 30 minutes in the IPA to remove adsorbed solvent molecules. The products were separated by centrifuging at about 8,000 rpm for about 20 minutes. If desired, an additional 20 minutes of centrifugation at about 8,000 rpm was performed to remove adsorbed solvent molecules. The black sediment was retrieved and washed by adding IPA or water with sonication for about 30 minutes, followed by centrifugation at about 7,000 rpm for about 15 minutes. This washing procedure was repeated twice more. The precipitate from the suspension was dried in a vacuum desiccator before further characterization and application.

Figure 1E:
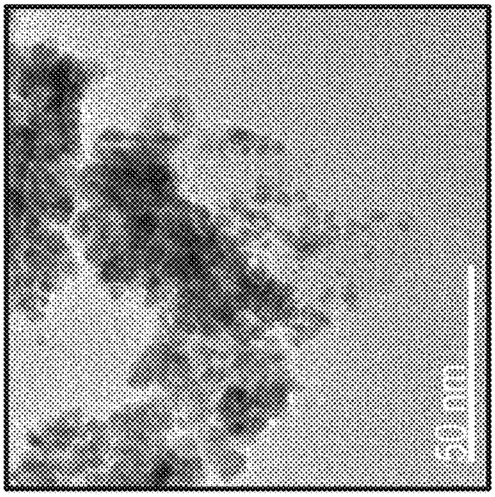
FIG. 1E shows a TEM image of example PtNiCoRu alloy nanoparticles supported on carbon black (Vulcan XC-72) according to at least one aspect of the present disclosure. (scale: 50 nm).
Figure 1F:
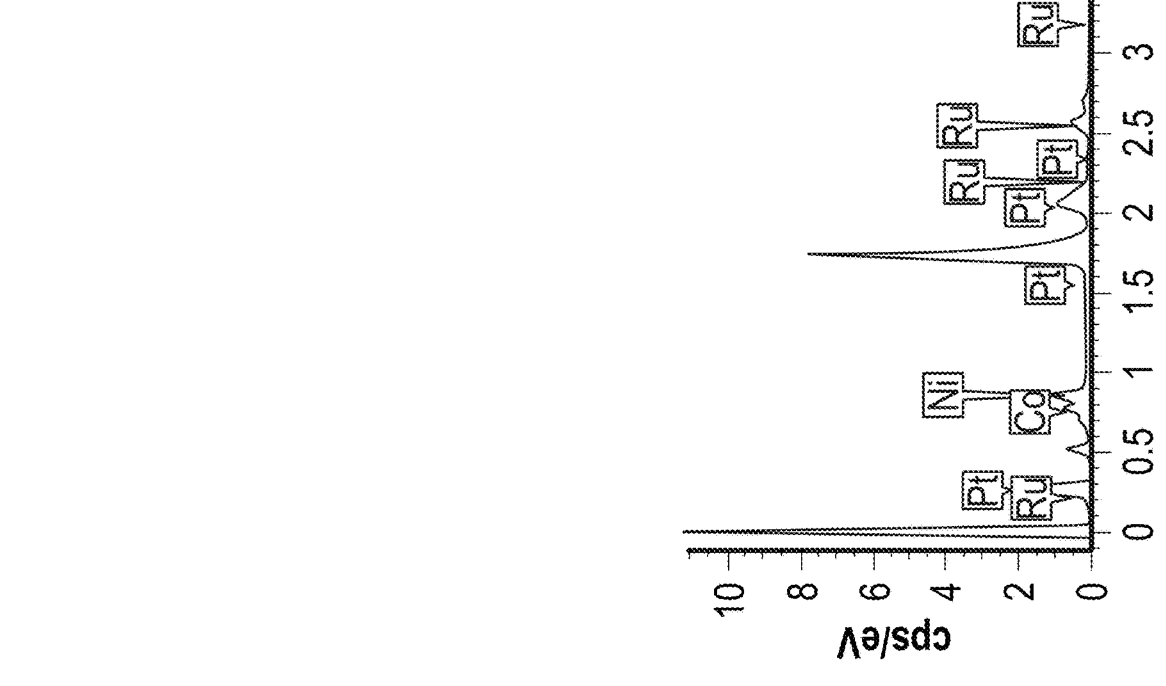
FIG. 1F is a SEM-EDS spectrum of the example carbon-supported PtNiCoRu alloy nanoparticles of FIG. 1E according to at least one aspect of the present disclosure.
Figure 1F:
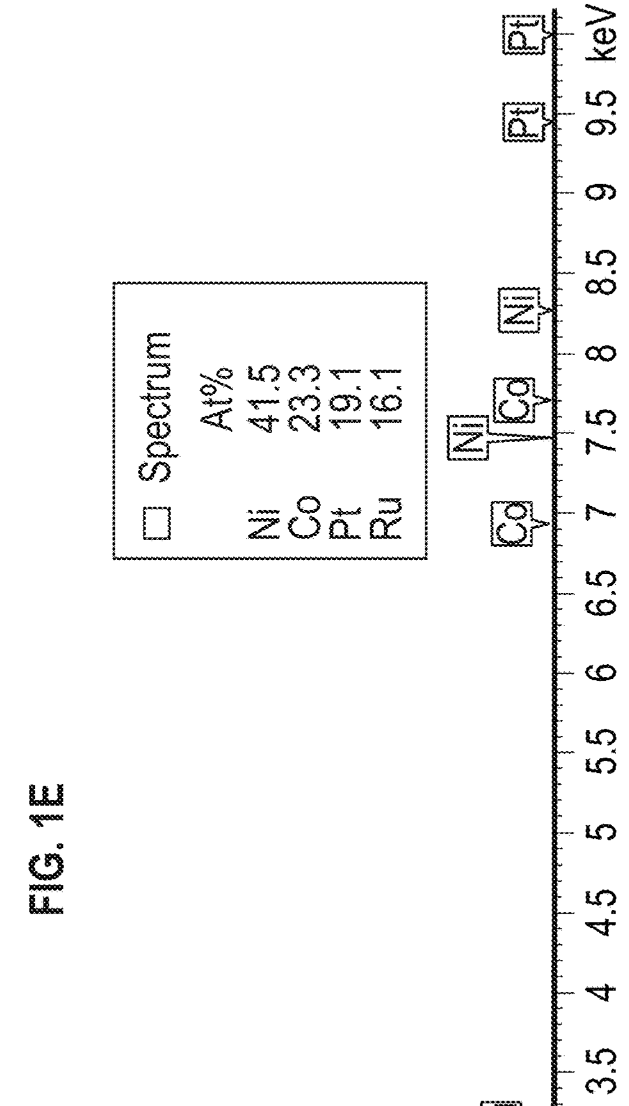

The resulting PtNiCoRu alloy nanoparticles of the carbon-supported PtNiCoRu alloy nanoparticles were determined to exist as single phase alloy nanoparticles. The PtNiCoRu alloy nanoparticles were determined to be chemically bonded to the carbon black. A TEM image and SEM EDS spectrum of the carbon-supported PtNiCoRu alloy nanoparticles are shown in FIGS. 1E and 1F respectively.

Various parameters were also investigated. For example, the temperature can vary from about 80° C. to about 220° C. The total reaction time (heating at the selected temperature) can vary from about 6 hours to about 48 hours. The amounts of each metal source can vary from about 10 mg to about 60 mg, and the amounts of carbon source and solvents can be varied. Other metal precursors such as chlorides, acetates, and nitrates can be utilized.

Table 1 shows the atomic % and molar ratio of selected carbon-supported multimetallic nanoparticles synthesized by processes described herein. Example 1 is multiwall carbon nanotube-supported PtNiCoRu alloy nanoparticles, Example 2 is the PtNiCoRu alloy nanoparticles, and Example 3 is carbon black-supported PtNiCoRu alloy nanoparticles.

TABLE 1

| Example | Pt, atomic % | Ni, atomic % | Co, atomic % | Ru, atomic % | Molar ratio of Pt:Ni:Co:Ru |
|---|---|---|---|---|---|
| Ex. 1 | 20 | 35 | 24 | 21 | $Pt_{20}Ni_{35}Co_{24}Ru_{21}$ |
| Ex. 2 | 47 | 19 | 10 | 24 | $Pt_{47}Ni_{19}Co_{10}Ru_{24}$ |
| Ex. 3 | 19 | 42 | 23 | 16 | $Pt_{19}Ni_{42}Co_{23}Ru_{16}$ |

Example 4: Example Synthesis of PtNiCoRuFe Alloy Nanoparticles

A one-step heating method was utilized for the synthesis. The synthesis method is a solvothermal approach using a 100 mL hydrothermal autoclave and a conventional oven for heating. First, $Pt(acac)_2$ (40 mg), $Ru(acac)_3$ (40 mg), $Co(acac)_3$ (40 mg), $Ni(acac)_2$ (40 mg), and $(Fe(acac)_3$ (40 mg) were sonicated for about 10 minutes in ethylene glycol (10 mL). The mixture was mixed and then transferred to the 100 mL autoclave reactor in the oven.

A heating oven was pre-heated to a temperature of about 170° C. The autoclave reactor containing the suspension was placed in the pre-heated oven and heated at the temperature of about 170° C. for about 24 hours. After the one-step heating process, the reactor was allowed to cool to about room temperature (about 20° C.) which took approximately 6 hours.

To remove excess unreacted precursors, solvent, and/or other byproducts, the supernatant was decanted, and about 25 mL of isopropanol (IPA) was added. The products were sonicated for about 30 minutes in the IPA to remove adsorbed solvent molecules. The products were separated by centrifuging at about 8,000 rpm for about 20 minutes. If desired, an additional 20 minutes of centrifugation at 8,000 rpm was performed to remove adsorbed solvent molecules. The black sediment was retrieved and washed by adding IPA or water with sonication for about 30 minutes, followed by centrifugation at about 7,000 rpm for about 15 minutes. This washing procedure was repeated twice more. The precipitate from the suspension was dried in a vacuum desiccator before further characterization and application.

The resulting PtNiCoRuFe alloy nanoparticles were determined to exist as single phase alloy nanoparticles. The PtNiCoRuFe alloy nanoparticles included about 49 atomic % Pt, about 16 atomic % Ni, about 11 atomic % Co, about 18 atomic % Ru, and about 6 atomic % Fe (molar ratio: $Pt_{25}Ni_{28}Co_{18}Ru_{18}Fe_{11}$).

Various parameters were also investigated. For example, the temperature can vary from about 80° C. to about 220° C. The total reaction time (heating at the selected temperature) can vary from about 6 hours to about 48 hours. The amounts of each metal source can vary from about 10 mg to about 60 mg, and the amounts of carbon source and solvents can be varied. Other metal precursors such as chlorides, acetates, and nitrates can be utilized.

Example 5: Example Direct Synthesis of PtNiCoRuFe Alloy (HEA) Nanoparticles on Reduced Graphene Oxide A one-step heating method was utilized for the synthesis. The synthesis method is a solvothermal approach using a 100 mL hydrothermal autoclave and a conventional oven for heating. First, $Pt(acac)_2$ (40 mg), $Ru(acac)_3$ (40 mg), $Co(acac)_3$ (40 mg), $Ni(acac)_2$ (40 mg), and $(Fe(acac)_3$ (40 mg) were sonicated for about 10 minutes in tetraethylene glycol (8 mL) to form a metal precursor mixture.

Reduced graphene oxide (rGO, 20 mg) were dispersed in ethylene glycol (EG, 10 mL) for about 30 min to form a uniform carbon-EG suspension due to high viscosity of the solvent. 2 mL of the rGO-EG suspension was gradually added into the metal precursor mixture with vigorously stirring for at least 20 min. The resulting well-mixed brown suspension containing all precursors was transferred to the 100 mL autoclave reactor in the oven.

A heating oven was pre-heated to a temperature of about 210° C. The autoclave reactor containing the suspension was placed in the pre-heated oven and heated at the temperature of about 210° C. for about 24 hours. After the one-step heating process, the reactor was allowed to cool to about room temperature (about 20° C.) which took approximately 6 hours.

To remove excess unreacted precursors, solvent, and/or other byproducts, the supernatant was decanted, and about 25 mL of isopropanol (IPA) was added. The products were sonicated for about 30 minutes in the IPA to remove adsorbed solvent molecules. The products were separated by centrifuging at about 8,000 rpm for about 20 minutes. If desired, an additional 20 minutes of centrifugation at about 8,000 rpm was performed to remove adsorbed solvent molecules. The black sediment was retrieved and washed by adding IPA or water with sonication for about 30 minutes, followed by centrifugation at about 7,000 rpm for about 15 minutes. This washing procedure was repeated twice more. The precipitate from the suspension was dried in a vacuum desiccator before further characterization and application.

Figure 2A:
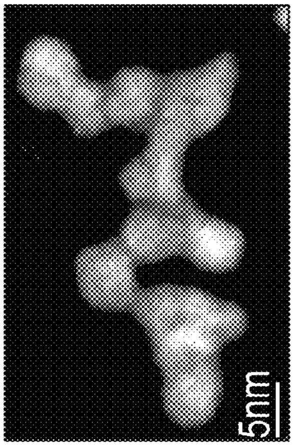
FIG. 2A is a high-angle annular dark-field scanning transmission electron microscopy (HAADF-STEM) image of an example high entropy alloy (HEA) supported on reduced graphene oxide (rGO), HEA-rGO, formed by a one-step heating process according to at least one aspect of the present disclosure. (scale: 5 nm).
Figure 2B:
FIGS. 2B-2H are EDS element mapping images of the HEA-rGO of FIG. 2A, showing the distribution of carbon (C), oxygen (O), iron (Fe), cobalt (Co), nickel (Ni), ruthenium (Ru), and platinum (Pt), according to at least one aspect of the present disclosure.
Figure 2C:
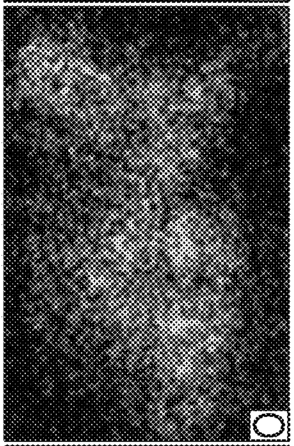
Figure 2D:
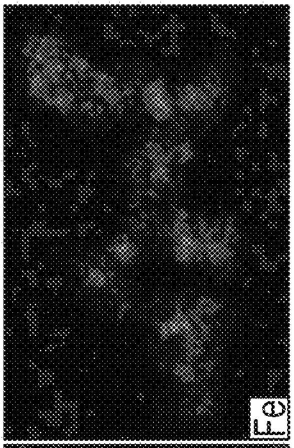
Figure 2E:
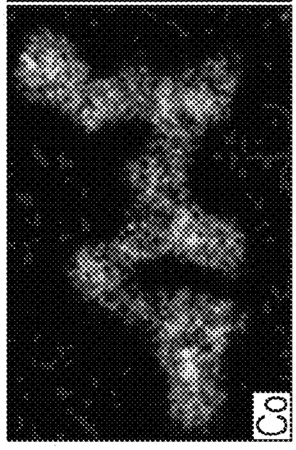
Figure 2F:
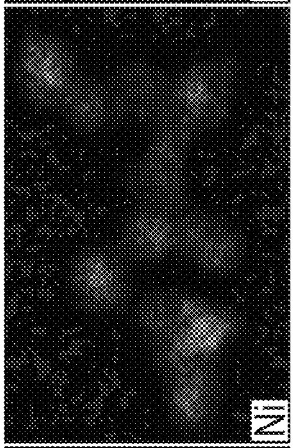
Figure 2G:
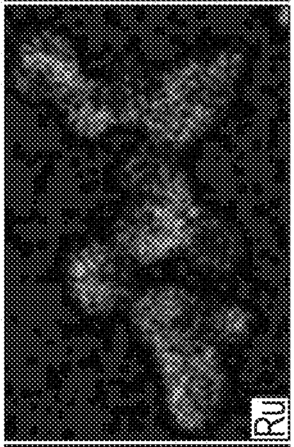
Figure 2H:
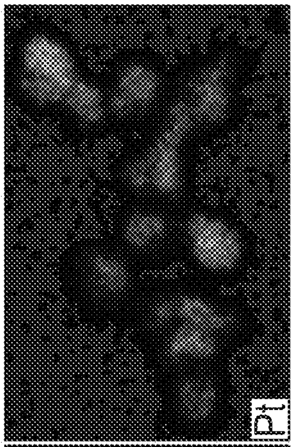

The resulting PtNiCoRuFe alloy nanoparticles of the carbon-supported PtNiCoRuFe alloy nanoparticles (an example HEA-rGO) were determined to exist as single phase alloy nanoparticles. The PtNiCoRuFe alloy nanoparticles were determined to be chemically bonded to the carbon black. FIG. 2A shows a HAADF-STEM image of the example HEA-rGO formed by Example 5. FIGS. 2B-2H show EDS element mapping images of the HEA-rGO shown in FIG. 2A, indicating the distribution of carbon (C), oxygen (O), iron (Fe), cobalt (Co), nickel (Ni), ruthenium (Ru), and platinum (Pt) in the example HEA-rGO.

Various parameters were also investigated. For example, the temperature can vary from about 80° C. to about 220° C. The total reaction time (heating at the selected temperature)

can vary from about 6 hours to about 48 hours. The amounts of each metal source can vary from about 10 mg to about 60 mg, and the amounts of carbon source and solvents can be varied. Other metal precursors such as chlorides, acetates, and nitrates can be utilized.

Table 2 shows a summary of the components based on SEM-EDS. In Table 2, Example 5A refers to the amounts of metal precursors, Example 5B refers to the initial product prior to washing to remove unreacted precursors, solvent, and/or other byproducts. Example 5C refers to the product after washing (two times) to remove unreacted precursors, solvent, and/or other byproducts.

TABLE 2

| Example | Pt, atomic % | Ni, atomic % | Co, atomic % | Ru, atomic % | Fe, atomic % | Sum | Molar ratio of Pt:Ni:Co:Ru:Fe |
|---|---|---|---|---|---|---|---|
| Ex. 5A | 16 | 25 | 25 | 16 | 18 | 100 | — |
| Ex. 5B | 23 | 29 | 21 | 17 | 10 | 100 | $Pt_{23}Ni_{29}Co_{21}Ru_{17}Fe_{10}$ |
| Ex. 5C | 25 | 28 | 18 | 18 | 11 | 100 | $Pt_{25}Ni_{28}Co_{18}Ru_{18}Fe_{11}$ |

Figure 4A:
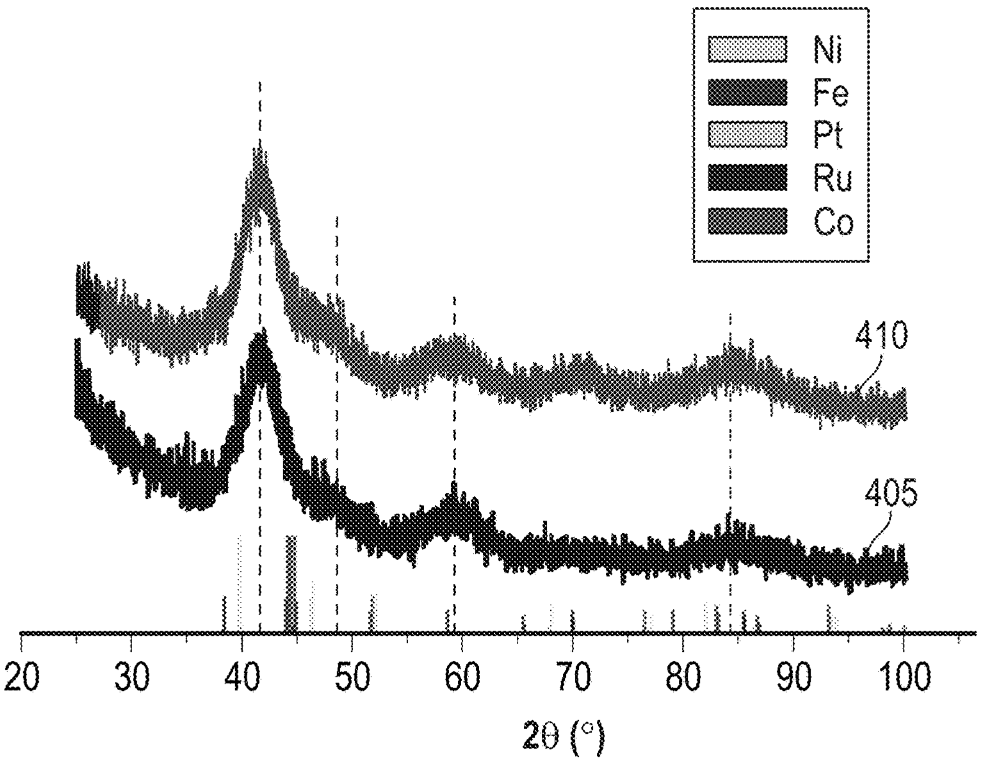
FIG. 4A shows an overlay of X-ray diffraction (XRD) patterns of an example HEA-rGO formed by a one-step heating process, before and after sulfuric acid treatment, according to at least one aspect of the present disclosure.

The example HEA-rGO synthesized by Example 5 was subjected to treatment with sulfuric acid. The XRD patterns of the HEA-rGO before (405) and after (410) are shown in FIG. 4A. The XRD patterns of FIG. 4A indicates that the PtNiCoRuFe alloy nanoparticles of the HEA-rGO are single-phase alloy nanoparticles. In contrast, HEAs formed by conventional methods are composed of unevenly distributed alloys in the crystals and exist as multiphase alloys, which impairs the advantages of their high mixing entropy.

The results shown in FIG. 4A also indicate that the HEA-rGO is very stable in strong acid solutions. The high chemical resistance against an acidic electrolyte, such as sulfuric acid, indicates that the example HEA-rGOs described herein can be good candidates for fuel cell applications in, for example, corrosive conditions.

Example 6: Example Direct Synthesis of PtNiCoRuFe Alloy (HEA) Nanoparticles on Reduced Graphene Oxide A step-wise heating method (multi-step heating method) was utilized for the synthesis. The synthesis method is a solvothermal approach using a 100 mL hydrothermal autoclave and a conventional oven for heating. First, $Pt(acac)_2$ (40 mg), $Ru(acac)_3$ (40 mg), $Co(acac)_3$ (40 mg), $Ni(acac)_2$ (40 mg), and $(Fe(acac)_3$ (40 mg) were sonicated for about 10 minutes in tetraethylene glycol (8 mL) to form a metal precursor mixture.

Reduced graphene oxide (rGO, 20 mg) were dispersed in ethylene glycol (EG, 10 mL) for about 30 min to form a uniform carbon-EG suspension due to high viscosity of the solvent. 2 mL of the rGO-EG suspension was gradually added into the metal precursor mixture with vigorously stirring for at least 20 min. The resulting well-mixed brown suspension containing all precursors was transferred to the 100 mL autoclave reactor in the oven.

A heating oven was pre-heated to a temperature of about 80° C. The autoclave reactor containing the suspension was placed in the pre-heated oven and heated at the temperature of about 80° C. for about 3 hours. The oven temperature was then increased to about 130° C. and the contents of the autoclave reactor were reacted at this temperature for about 24 hours. Subsequently, the oven temperature was further increased to about 210° C., and the contents of the autoclave reactor were reacted at this temperature for about 24 hours.

After the step-wise heating process, the reactor was allowed to cool to about room temperature (about 20° C.) which took approximately 6 hours. To remove excess unreacted precursors, solvent, and/or other byproducts, the supernatant was decanted, and about 25 mL of isopropanol (IPA) was added. The products were sonicated for about 30 minutes in the IPA to remove adsorbed solvent molecules. The products were separated by centrifuging at about 8,000 rpm for about 20 minutes. If desired, an additional 20 minutes of centrifugation at about 8,000 rpm was performed to remove adsorbed solvent molecules. The black sediment was retrieved and washed by adding IPA or water with sonication for about 30 minutes, followed by centrifugation at about 7,000 rpm for about 15 minutes. This washing procedure was repeated twice more. The precipitate from the suspension was dried in a vacuum desiccator before further characterization and application.

Figure 3A:
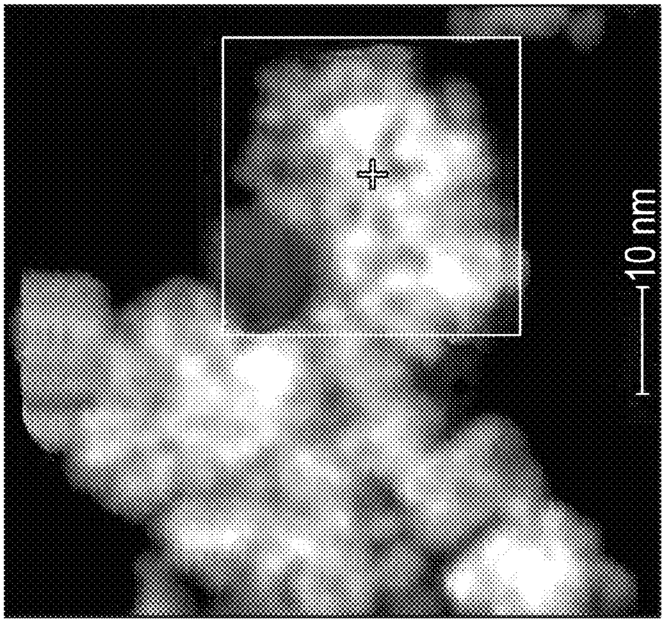
FIG. 3A is a HAADF-STEM image of an example high entropy alloy (HEA) supported on reduced graphene oxide (rGO), HEA-rGO, formed by a multi-step heating process according to at least one aspect of the present disclosure. (scale: 10 nm).
Figure 3B:
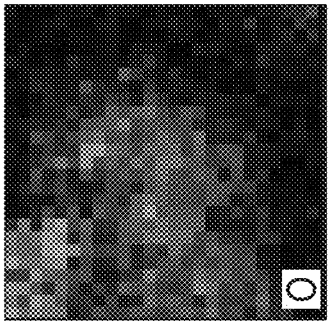
FIGS. 3B-3G are EDS element mapping images of the HEA-rGO of FIG. 3A, showing the distribution of O, Fe, Co, Ni, Ru, and Pt according to at least one aspect of the present disclosure.
Figure 3C:
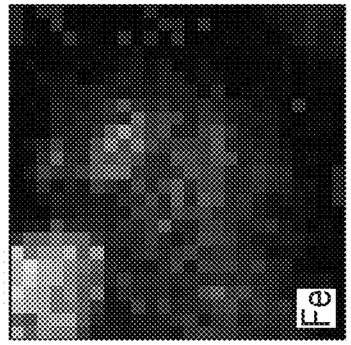
Figure 3D:
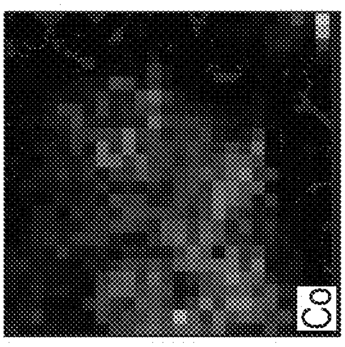
Figure 3E:
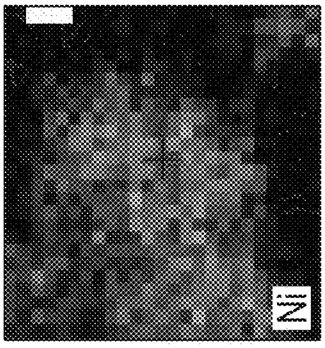
Figure 3F:
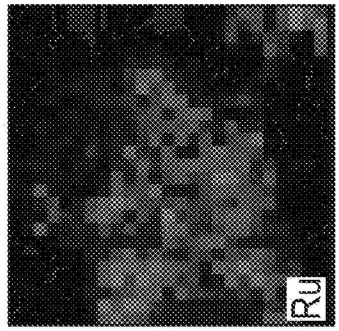
Figure 3G:
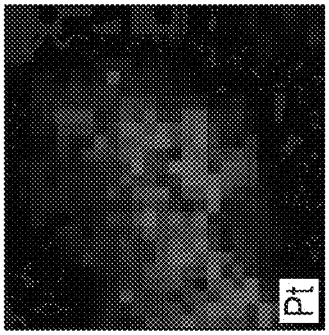
Figure 3H:
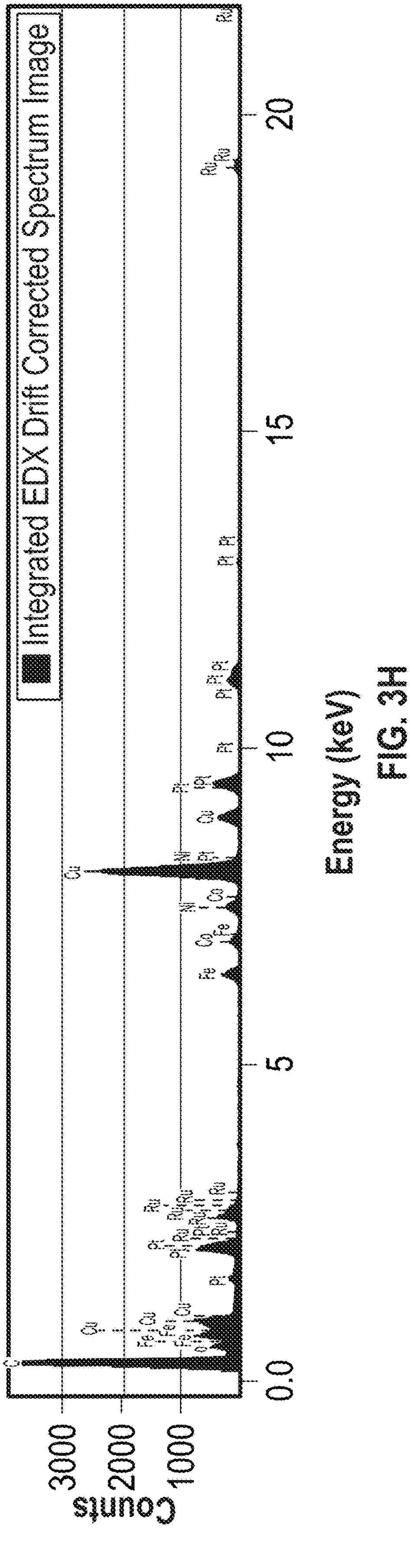
FIG. 3H shows an EDX spectrum Energy-dispersive X-ray (EDX) spectrum of the HEA-rGO of FIG. 3A according to at least one aspect of the present disclosure.
Figure 4B:
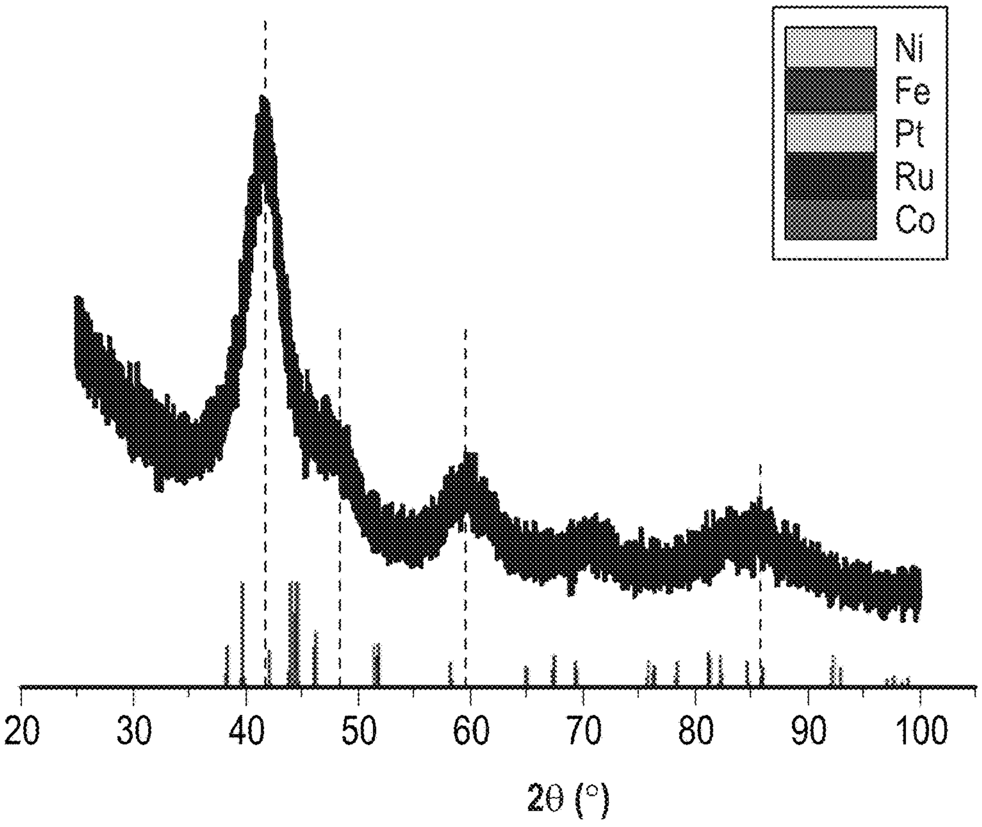
FIG. 4B shows a XRD pattern of an example HEA-rGO formed by a multi-step heating process according to at least one aspect of the present disclosure.

The resulting PtNiCoRuFe alloy nanoparticles of the carbon-supported PtNiCoRuFe alloy nanoparticles (an example HEA-rGO) were determined to exist as single phase alloy nanoparticles. The PtNiCoRuFe alloy nanoparticles were determined to be chemically bonded to the carbon black. FIG. 3A shows a HAADF-STEM image of the example HEA-rGO formed by Example 6. FIGS. 3B-3H show EDS element mapping images of the HEA-rGO shown in FIG. 3A, indicating the distribution of oxygen, iron, cobalt, nickel, ruthenium (Ru), and platinum (Pt) in the example HEA-rGO. An XRD pattern of the example HEA-rGO synthesized by Example 6 is shown in FIG. 4B. The XRD pattern of FIG. 4B indicates that the PtNiCoRuFe alloy nanoparticles of the HEA-rGO are single-phase alloy nanoparticles. In contrast, HEAs formed by conventional methods are composed of unevenly distributed alloys in the crystals and exist as multiphase alloys, which impairs the advantages of their high mixing entropy.

Various parameters were also investigated. For example, the temperature can vary from about 80° C. to about 220° C. The total reaction time (heating at the selected temperature) can vary from about 6 hours to about 72 hours. The amounts of each metal source can vary from about 10 mg to about 60 mg, and the amounts of carbon source and solvents can be varied. Other metal precursors such as chlorides, acetates, and nitrates can be utilized.

To the inventors' knowledge, the synthesis by Example 5 and Example 6 are the first report of synthesizing PtNiCoRuFe HEA nanoparticles supported on graphene oxide.

Table 3 shows a summary of the components based on SEM-EDS. In Table 3, Example 6A refers to the amounts of metal precursors used for the synthesis, Example 6B refers to the product obtained by the synthesis.

TABLE 3

| Example | Pt, atomic % | Ni, atomic % | Co, atomic % | Ru, atomic % | Fe, atomic % | Sum | Molar ratio of Pt:Ni:Co:Ru:Fe |
|---|---|---|---|---|---|---|---|
| Ex. 6A | 17 | 19 | 25 | 16 | 23 | 100 | — |
| Ex. 6B | 27 | 25 | 20 | 19 | 9 | 100 | $Pt_{27}Ni_{25}Co_{20}Ru_{19}Fe_{9}$ |

Overall, aspects described herein provide a process for forming multimetallic nanoparticles with and without various carbon supports in mild synthetic conditions. Aspects of the present disclosure can enable synthesis of single phase alloy nanoparticles. In some examples, the HEAs that include an iron element can be obtained in the presence of graphene oxide. To the inventors' knowledge, this is the first report of synthesizing PtNiCoRuFe HEA nanoparticles on graphene oxide.

In addition, and unlike conventional carbon supported catalysts that easily dissolve into an electrolyte solution or drop off from carbon supports, carbon-supported multimetallic alloys formed by aspects described herein (such as the carbon-supported HEAs) are stable due to, for example, chemical bonding between the nanocatalysts and the carbon support. The HEA-rGO has high chemical resistance again acidic electrolyte, such as sulfuric acid, indicating that it is a promising candidate for fuel cell applications.

Aspects Listing

The present disclosure provides, among others, the following aspects, each of which can be considered as optionally including any alternate aspects:

Clause A1. A process for forming carbon-supported PtNiCoRu nanoparticles, the process comprising:

forming a mixture comprising a platinum (Pt) metal source, a nickel (Ni) metal source, a cobalt (Co) metal source, a ruthenium (Ru) metal source, a carbon source, and a solvent; and heating the mixture at a temperature that is from about 80° C. to about 250° C. to form carbon-supported nanoparticles, the carbon-supported nanoparticles comprising: a carbon support; and PtNiCoRu single phase alloy nanoparticles chemically bonded to the carbon support.

Clause A2. The process of Clause A1, wherein the solvent is selected from the group consisting of a monohydric alcohol, a polyhydric alcohol, or combinations thereof.

Clause A3. The process of Clause A1 or Clause A2, wherein the solvent comprises a polyhydric alcohol selected from the group consisting of ethylene glycol, tetraethylene glycol, diethylene glycol, propylene glycol, glycerol, and combinations thereof.

Clause A4. The process of any one of Clauses A1-A3, wherein the carbon source comprises carbon black, carbon nanotube, carbon nanofiber, mesoporous carbon, carbon nanowire, acetylene black, graphite, graphene, graphene oxide, fullerene, or combinations thereof.

Clause A5. The process of any one of Clauses A1-A4, wherein the carbon source comprises a structure having graphitic bonds partially incorporating one or more heteroatoms.

Clause A6. The process of Clause A5, wherein the one or more heteroatoms comprises oxygen.

Clause A7. The process of Clause A5 or Clause A6, wherein the structure having graphitic bonds partially incorporating one or more heteroatoms comprises a nanotube, nanobud, fullerene, nano-peapod, endofullerene, nano-onion, graphene oxide, reduced graphene oxide, lacey carbon, or combinations thereof.

Clause B1. A process for forming carbon-supported PtNiCoRuFe nanoparticles, the process comprising:

forming a mixture comprising a platinum (Pt) metal source, a nickel (Ni) metal source, a cobalt (Co) metal source, a ruthenium (Ru) metal source, an iron (Fe) metal source, a carbon source, and a solvent; and heating the mixture at a temperature that is from about 80° C. to about 250° C. to form carbon-supported nanoparticles, the carbon-supported nanoparticles comprising: a carbon support; and PtNiCoRuFe single phase alloy nanoparticles chemically bonded to the carbon support.

Clause B2. The process of Clause B1, wherein the heating the mixture is performed by a one-step heating process comprising:

heating at a temperature that is from about 170° C. to about 250° C. for about 6 hours to about 48 hours.

Clause B3. The process of Clause B1 or Clause B2, wherein the heating the mixture is performed by a one-step heating process comprising:

heating the mixture at a first temperature or a first temperature range that is from 50° C. to less than 110° C. for a first period; then heating the mixture at a second temperature or a second temperature range that is from 110° C. to less than 170° C. for a second period; and then heating the mixture at a third temperature or a third temperature range that is from 170° C. to 250° C. or less for a third period.

Clause B4. The process of any one of Clauses B1-B3, wherein the solvent comprises a polyhydric alcohol.

Clause B5. The process of any one of Clauses B1-B4, wherein the carbon source comprises carbon black, carbon nanotube, carbon nanofiber, mesoporous carbon, carbon nanowire, acetylene black, graphite, graphene, graphene oxide, fullerene, or combinations thereof.

Clause B6. The process of any one of Clauses B1-B5, wherein the carbon source comprises a structure having graphitic bonds partially incorporating oxygen atoms.

Clause B7. The process of Clause B6, wherein the structure having graphitic bonds partially incorporating one or more heteroatoms comprises a nanotube, nanobud, fullerene, nano-peapod, endofullerene, nano-onion, graphene oxide, reduced graphene oxide, lacey carbon, or combinations thereof.

Clause C1. A process for forming multimetallic single phase alloy nanoparticles, the process comprising:

forming a mixture comprising a platinum (Pt) metal source, a nickel (Ni) metal source, a cobalt (Co) metal source, a ruthenium (Ru) metal source, and a solvent in a reactor; and heating the mixture in the reactor at a temperature that is from about 80° C. to about 250° C. while the reactor is pressurized from about 0.12 MPa to about 0.22 MPa to form multimetallic single phase alloy nanoparticles comprising Pt, Ni, Co, and Ru.

Clause C2. The process of Clause C1, wherein:

the multimetallic single phase alloy nanoparticles are PtNiCoRu nanoparticles; and the PtNiCoRu nanoparticles consist of:

from about 30 atomic % to about 50 atomic % of Pt based on a total atomic % of the Pt, Ni, Co, and Ru in the PtNiCoRu nanoparticles, the total atomic % not to exceed 100 atomic % of the Pt, Ni, Co, and Ru in the PtNiCoRu nanoparticles;

from about 9 atomic % to about 29 atomic % of Ni based on the total atomic % of the Pt, Ni, Co, and Ru in the PtNiCoRu nanoparticles;

from about 10 atomic % to about 30 atomic % of Co based on the total atomic % of the Pt, Ni, Co, and Ru in the PtNiCoRu nanoparticles; and from about 11 atomic % to about 31 atomic % of Ru based on the total atomic % of the Pt, Ni, Co, and Ru in the PtNiCoRu nanoparticles.

Clause C3. The process of Clause C1 or Clause C2, wherein:

the mixture further includes an iron metal source; and the multimetallic single phase alloy nanoparticles further comprise Fe.

Clause C4. The process of Clause C3, wherein:

the multimetallic single phase alloy nanoparticles are PtNiCoRuFe nanoparticles; and the PtNiCoRuFe nanoparticles consist of:

from about 18 atomic % to about 32 atomic % of Pt based on a total atomic % of the Pt, Ni, Co, Ru, and Fe in the PtNiCoRuFe nanoparticles, the total atomic % of the Pt, Ni, Co, Ru, and Fe in the PtNiCoRuFe nanoparticles not to exceed 100 atomic %;

from about 20 atomic % to about 34 atomic % of Ni based on the total atomic % of the Pt, Ni, Co, Ru, and Fe in the PtNiCoRuFe nanoparticles;

from about 12 atomic % to about 26 atomic % of Co based on the total atomic % of the Pt, Ni, Co, Ru, and Fe in the PtNiCoRuFe nanoparticles;

from about 12 atomic % to about 24 atomic % of Ru based on the total atomic % of the Pt, Ni, Co, Ru, and Fe in the PtNiCoRuFe nanoparticles; and from about 4 atomic % to about 16 atomic % of Fe based on the total atomic % of the Pt, Ni, Co, Ru, and Fe in the PtNiCoRuFe nanoparticles.

Clause C5. The process of any one of Clauses $C_1$-$C_4$, wherein the solvent comprises a glycol.

Clause C6. The process of Clause C5, wherein the glycol is selected from the group consisting of ethylene glycol, tetraethylene glycol, diethylene glycol, propylene glycol, glycerol, and combinations thereof.

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "Is" preceding the recitation of the composition, element, or elements and vice versa, e.g., the terms "comprising," "consisting essentially of," "consisting of" also include the product of the combinations of elements listed after the term.

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa, e.g., the terms "comprising," "consisting essentially of," "consisting of" also include the product of the combinations of elements listed after the term.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise. For example, aspects comprising "a carbon source" include aspects comprising one, two, or more carbon sources, unless specified to the contrary or the context clearly indicates only one carbon source is included.

While the foregoing is directed to aspects of the present disclosure, other and further aspects of the disclosure may be devised without departing from the basic scope thereof, and the scope thereof is determined by the claims that follow.

What is claimed is:

1. A process for forming carbon-supported PtNiCoRu nanoparticles, the process comprising:

forming a mixture consisting essentially of a platinum (Pt) metal source, a nickel (Ni) metal source, a cobalt (Co) metal source, a ruthenium (Ru) metal source, a carbon source, and a solvent, wherein the solvent is selected from the group consisting of a monohydric alcohol, a polyhydric alcohol, or combinations thereof; and heating the mixture at a temperature that is from about 80° C. to about 250° C. to form carbon-supported nanoparticles, the carbon-supported nanoparticles comprising:

a carbon support; and

PtNiCoRu single phase alloy nanoparticles chemically bonded to the carbon support, wherein the PtNiCoRu nanoparticles consisting essentially of:

from about 30 atomic % to about 50 atomic % of Pt based on a total atomic % of the Pt, Ni, Co, and Ru in the PtNiCoRu nanoparticles, the total atomic % not to exceed 100 atomic % of the Pt, Ni, Co, and Ru in the PtNiCoRu nanoparticles;

from about 9 atomic % to about 29 atomic % of Ni based on the total atomic % of the Pt, Ni, Co, and Ru in the PtNiCoRu nanoparticles;

from about 10 atomic % to about 30 atomic % of Co based on the total atomic % of the Pt, Ni, Co, and Ru in the PtNiCoRu nanoparticles; and from about 11 atomic % to about 31 atomic % of Ru based on the total atomic % of the Pt, Ni, Co, and Ru in the PtNiCoRu nanoparticles.

2. The process of claim 1, wherein the solvent comprises a polyhydric alcohol selected from the group consisting of ethylene glycol, tetraethylene glycol, diethylene glycol, propylene glycol, glycerol, and combinations thereof.

3. The process of claim 2, wherein the solvent comprises tetraethylene glycol.

4. The process of claim 1, wherein the carbon source comprises carbon black, carbon nanotube, carbon nanofiber, mesoporous carbon, carbon nanowire, acetylene black, graphite, graphene, graphene oxide, fullerene, or combinations thereof.

5. The process of claim 1, wherein the carbon source comprises a structure having graphitic bonds partially incorporating one or more heteroatoms.

6. The process of claim 5, wherein the one or more heteroatoms comprises oxygen.

7. The process of claim 5, wherein the structure having graphitic bonds partially incorporating one or more heteroatoms comprises a nanotube, nanobud, fullerene, nano-peapod, endofullerene, nano-onion, graphene oxide, reduced graphene oxide, lacey carbon, or combinations thereof.

8. A process for forming carbon-supported PtNiCoRuFe nanoparticles, the process comprising:

forming a mixture comprising a platinum (Pt) metal source, a nickel (Ni) metal source, a cobalt (Co) metal source, a ruthenium (Ru) metal source, an iron (Fe) metal source, a carbon source, and a solvent, wherein the carbon source comprises carbon nanofiber, mesoporous carbon, carbon nanowire, acetylene black, graphene, a graphene derivative, fullerene, or combinations thereof; and heating the mixture at a temperature that is from about 80° C. to about 250° C. to form carbon-supported nanoparticles, the carbon-supported nanoparticles comprising: a carbon support; and PtNiCoRuFe single phase alloy nanoparticles chemically bonded to the carbon support, wherein the carbon source comprises graphene, a graphene derivative, or combinations thereof.

9. The process of claim 8, wherein the heating the mixture is performed by a one-step heating process comprising:

heating at a temperature that is from about 170° C. to about 250° C. for about 6 hours to about 48 hours.

10. The process of claim 8, wherein the heating the mixture is performed by a heating process comprising:

heating the mixture at a first temperature or a first temperature range that is from 50° C. to less than 110° C. for a first period; then heating the mixture at a second temperature or a second temperature range that is from 110° C. to less than 170° C. for a second period; and then heating the mixture at a third temperature or a third temperature range that is from 170° C. to 250° C. or less for a third period.

11. The process of claim 8, wherein the solvent comprises a polyhydric alcohol.

12. The process of claim 8, wherein the carbon source further comprises graphitic bonds partially incorporating oxygen atoms.

13. The process of claim 8, wherein the graphene derivative comprises a nanobud, a fullerene, a nano-peapod, an endofullerene, a nano-onion, a graphene oxide, a reduced graphene oxide, a lacey carbon, or combinations thereof.

14. A process for forming multimetallic single phase alloy nanoparticles, the process comprising:

forming a mixture consisting essentially of a platinum (Pt) metal source, a nickel (Ni) metal source, a cobalt (Co) metal source, a ruthenium (Ru) metal source, and a solvent in a reactor, wherein the solvent is selected from the group consisting of a monohydric alcohol, a polyhydric alcohol, or combinations thereof; and heating the mixture in the reactor at a temperature that is from about 80° C. to about 250° C. while the reactor is pressurized from about 0.12 MPa to about 0.22 MPa to form multimetallic single phase alloy nanoparticles consisting essentially of Pt, Ni, Co, and Ru, wherein:

the multimetallic single phase alloy nanoparticles are PtNiCoRu nanoparticles; and the PtNiCoRu nanoparticles consisting essentially of:

from about 30 atomic % to about 50 atomic % of Pt based on a total atomic % of the Pt, Ni, Co, and Ru in the PtNiCoRu nanoparticles, the total atomic % not to exceed 100 atomic % of the Pt, Ni, Co, and Ru in the PtNiCoRu nanoparticles;

from about 9 atomic % to about 29 atomic % of Ni based on the total atomic % of the Pt, Ni, Co, and Ru in the PtNiCoRu nanoparticles;

from about 10 atomic % to about 30 atomic % of Co based on the total atomic % of the Pt, Ni, Co, and Ru in the PtNiCoRu nanoparticles; and from about 11 atomic % to about 31 atomic % of Ru based on the total atomic % of the Pt, Ni, Co, and Ru in the PtNiCoRu nanoparticles.

15. The process of claim 14, wherein the solvent comprises a glycol.

16. The process of claim 15, wherein the glycol is selected from the group consisting of ethylene glycol, tetraethylene glycol, diethylene glycol, propylene glycol, glycerol, and combinations thereof.

* * * * *